(12) United States Patent
Chuang et al.

(10) Patent No.: US 11,750,294 B2
(45) Date of Patent: *Sep. 5, 2023

(54) OPTICAL COMMUNICATION INTERFACE SYSTEM

(71) Applicant: Artilux, Inc., Menlo Park, CA (US)

(72) Inventors: Shih-Tai Chuang, Hsinchu County (TW); Shih-Jie Wu, Hsinchu County (TW); Li-Gang Lai, Hsinchu County (TW); Yien-Tien Chou, Hsinchu County (TW); Shao-Chien Chang, Hsinchu County (TW); Kai-Wei Chiu, Hsinchu County (TW); Shu-Lu Chen, Hsinchu County (TW)

(73) Assignee: ARTILUX, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,917

(22) Filed: May 9, 2022

(65) Prior Publication Data

US 2022/0263580 A1 Aug. 18, 2022

Related U.S. Application Data

(63) Continuation of application No. 17/387,614, filed on Jul. 28, 2021, now Pat. No. 11,329,726.

(60) Provisional application No. 63/060,671, filed on Aug. 4, 2020.

(51) Int. Cl.
*H04B 10/40* (2013.01)
(52) U.S. Cl.
CPC .................. *H04B 10/40* (2013.01)
(58) Field of Classification Search
CPC ...................................... H04B 10/40

USPC .......................................... 398/135
See application file for complete search history.

(56) References Cited

U.S. PATENT DOCUMENTS

| 7,359,647 | B1 | 4/2008 | Faria et al. |
| 7,813,646 | B2 | 10/2010 | Furey |
| 7,876,989 | B2 | 1/2011 | Aronson et al. |
| 9,869,835 | B2 | 1/2018 | Hoeltke et al. |

(Continued)

FOREIGN PATENT DOCUMENTS

WO WO 2010/013113 2/2010

OTHER PUBLICATIONS

Extended European Search Report for Application No. EP22186349.1, dated Dec. 22, 2022, 10 pages.

*Primary Examiner* — Dalzid E Singh
(74) *Attorney, Agent, or Firm* — Dority & Manning, P.A.

(57) ABSTRACT

Systems and methods for optical communication are provided. For instance, a method for optical communication can include receiving, by a first coupling module, a power-on signal from a first electronic device coupled to the first coupling module. The method can also include relaying, by the first coupling module, a first optical signal to a second coupling module coupled to a second electronic device. The method can also include relaying, by the second coupling module, in response to receipt of the first optical signal, a second optical signal to the first coupling module. The method can also include activating, by the first coupling module, in response to receipt of the second optical signal, a data transfer circuit for relaying data via an optical communication interface between the first coupling module and the second coupling module.

20 Claims, 16 Drawing Sheets

(56) References Cited

U.S. PATENT DOCUMENTS

| | | |
|---|---|---|
| 9,971,115 B2 * | 5/2018 | Jiang .................... H04B 10/516 |
| 9,979,481 B2 | 5/2018 | Parekh et al. |
| 10,247,891 B2 | 4/2019 | Jiang et al. |
| 10,326,245 B1 | 6/2019 | Parekh et al. |
| 10,379,309 B2 | 8/2019 | Bauco et al. |
| 10,440,424 B2 | 10/2019 | Toba |
| 2006/0077778 A1 | 4/2006 | Tatum et al. |
| 2006/0280055 A1 * | 12/2006 | Miller .................... G09G 5/006 |
| | | 398/155 |
| 2010/0188567 A1 * | 7/2010 | Ichimura ............ H04N 21/6336 |
| | | 348/E7.003 |
| 2010/0271486 A1 | 10/2010 | Bohm |
| 2011/0020007 A1 * | 1/2011 | Ekkizogloy ............ H04B 10/40 |
| | | 398/139 |
| 2011/0208980 A1 * | 8/2011 | Brooks .................... G06F 1/266 |
| | | 713/300 |
| 2014/0327833 A1 | 11/2014 | Kabuto |
| 2016/0020912 A1 | 1/2016 | Charbonneau-Lefort et al. |
| 2018/0091851 A1 * | 3/2018 | Bae .................. H04N 21/42204 |
| 2020/0233166 A1 | 7/2020 | Shimizu et al. |

\* cited by examiner

OPTICAL COMMUNICATION INTERFACE SYSTEM

PRIORITY CLAIM

The present application claims filing benefit of U.S. patent application Ser. No. 17/387,614 having a filing date of Jul. 28, 2021 and U.S. Provisional Patent Application Ser. No. 63/060,671 having a filing date of Aug. 4, 2020, which are incorporated herein by reference in their entirety.

FIELD

The present disclosure relates generally to communication interfaces. In particular, the present disclosure relates to optical communication interfaces for protocols such as High-Definition Multimedia Interface (HDMI).

BACKGROUND

For high-speed communication, many types of communication interfaces have been developed and used. For example, High-Definition Multimedia Interface (HDMI), Universal Serial Bus (USB), Display Port (DP), Digital Visual Interface (DVI), and Video Graphics Array (VGA) interfaces are relatively common in the market and have continued to evolve. For example, HDMI is an audio/video interface for transmitting compressed or uncompressed audio/video data from a source device (e.g., a Blu-ray Disc (BD) Player) to a sink device (e.g., a TV). With the increasing prevalence of multimedia applications, additional implementations of HDMI usage are regularly occurring. HDMI communication systems can transmit signals by electrical manner or optical manner or hybrid manner (i.e., a combination of electrical and optical) in a communication interface. For example, in an electrical implementation, electrical wires are equipped in a cable, and in an optical implementation, optical fibers are equipped in a cable. In a hybrid implementation, electrical wires and optical fibers are equipped in a cable.

SUMMARY

Aspects and advantages of embodiments of the present disclosure will be set forth in part in the following description, or may be learned from the description, or may be learned through practice of the embodiments.

One example aspect of the present disclosure is directed to a dual direction optical communication interface system including a first coupling module, a second coupling module, and a cable. The first coupling module includes a first connector for coupling to a first electronic device and a first optical transceiver that is configured for use as either a sink or source for HDMI communication. The second coupling module includes a second connector for coupling to a second electronic device and a second optical transceiver that is configured for use as either a sink or source for HDMI communication. The cable is coupled between the first coupling module and the second coupling module and includes one or more optical fibers. The cable is further configured to provide data transmission and reception over a plurality of channels between the first coupling module and the second coupling module.

In some example embodiments, the first optical transceiver is configured to both transmit optical audio/video signals to the second optical transceiver via the one or more optical fibers and to receive optical audio/video signals from the second optical transceiver, while the second optical transceiver is configured to both transmit optical audio/video signals to the first optical transceiver via the one or more optical fibers and to receive optical audio/video signals from the first optical transceiver.

In some example embodiments, each of the one or more optical fibers is configured to transmit and receive data of a corresponding bidirectional data communication channel of a plurality of bidirectional data communication channels between the first coupling module and the second coupling module.

In some example embodiments, the cable includes a first set of optical fibers and a second set of optical fibers. The first set of optical fibers is configured for single direction data transmission of data communication channels from the first coupling module to the second coupling module. The second set of optical fibers configured for single direction data transmission of data communication channels from the second coupling module to the first coupling module.

In some example embodiments, the first optical transceiver is configured to both transmit and receive video signals, audio signals, and control status signals to and from the first electronic device, while the second optical transceiver is configured to both transmit and receive video signals, audio signals, and control status signals to and from the second electronic device.

In some example embodiments, the first coupling module includes a first non-transitory computer-readable storage medium configured to store data indicative of the display capabilities of the first electronic device when the first electronic device is configured to serve as a sink device, while the second coupling module includes a second non-transitory computer-readable storage medium configured to store data indicative of the display capabilities of the second electronic device when the second electronic device is configured to serve as a sink device.

In some example embodiments, the cable includes an optical fiber or an electrical wire for a bidirectional hot plug detect (HPD) transmission channel configured to relay confirmation of a power-on signal detected at either the first electronic device or the second electronic device.

In some example embodiments, at least one of the first coupling module or the second coupling module is detachable from the cable. More particularly, the first coupling module can include a first cable connector that is configured such that the first coupling module is detachable from the cable, while the second coupling module can include a second cable connector that is configured such that the second coupling module is detachable from the cable.

In some example embodiments, at least one of the first coupling module or the second coupling module includes a touch sensor configured to toggle data transmission over the cable on and off.

Another example aspect of the present disclosure is directed to an optical communication interface system that includes a first coupling module, a second coupling module, a cable, and a switch. The first coupling module includes a first device connector for coupling to a first electronic device, a first coupling circuit including data relay circuitry, and a first circuit housing substantially encasing the first coupling circuit. The second coupling module includes a second device connector for coupling to a second electronic device, a second coupling circuit including data relay circuitry, and a second circuit housing substantially encasing the second coupling circuit. The cable is coupled between the first coupling module and the second coupling module, includes one or more optical fibers, and is configured to provide data transmission and reception over a plurality of channels between the first coupling module and the second coupling module. The switch is positioned on at least one of the first circuit housing or the second circuit housing. The switch is configured to toggle data transmission on and off over the plurality of channels between the first coupling module and the second coupling module.

In some example embodiments, the switch includes a touch sensor.

In some example embodiments, the first coupling module includes a first optical transceiver and the second coupling module comprises a second optical transceiver. The first optical transceiver is configured to both transmit optical audio/video signals to the second optical transceiver via the one or more optical fibers and to receive optical audio/video signals from the second optical transceiver. The second optical transceiver is configured to both transmit optical audio/video signals to the first optical transceiver via the one or more optical fibers and to receive optical audio/video signals from the first optical transceiver.

In some example embodiments, each of the one or more optical fibers is configured to transmit and receive data of a corresponding bidirectional data communication channel of a plurality of bidirectional data communication channels between the first coupling module and the second coupling module.

In some example embodiments, the cable includes a first set of optical fibers and a second set of optical fibers. The first set of optical fibers is configured for single direction data transmission of data communication channels from the first coupling module to the second coupling module. The second set of optical fibers is configured for single direction data transmission of data communication channels from the second coupling module to the first coupling module.

In some example embodiments, at least one of the first coupling module or the second coupling module is detachable from the cable.

Yet another example aspect of the present disclosure is directed to an optical communication interface system that includes a first coupling module, a second coupling module, and a cable. The first coupling module includes a first device connector for coupling to a first electronic device and a data transmitter for transmitting data received from the first electronic device. The second coupling module includes a second device connector for coupling to a second electronic device and a data receiver for receiving data designated for receipt by the second electronic device. The cable is coupled between the first coupling module and the second coupling module, includes one or more optical fibers, and is configured to provide data transmission and reception over a plurality of channels between the first coupling module and the second coupling module. One or more channels of the plurality of channels are operated in a power saving mode when there is no data to transmit between the first coupling module and the second coupling module.

In some example embodiments, the first coupling module includes a power saving circuit configured to receive a plurality of data signal lines from the first electronic device and to generate a control signal to operate one or more channels of the plurality of channels in a power saving mode when one or more data signal lines of the plurality of data signal lines from the first electronic device indicate that no data is available.

In some example embodiments, the first coupling module is configured to monitor the presence of data on a plurality of data signal lines from the first electronic device. When no data has been present on one or more data signal lines of the plurality of data signal lines for a threshold amount of time, one or more channels associated with the one or more data signal lines are configured to operate in a power saving mode.

In some example embodiments, the second coupling module includes a power saving circuit configured to monitor a given channel of the plurality of channels between the first coupling module and the second coupling module, the given channel designated in an operational mode for traffic detection. Operation of remaining channels of the plurality of channels between the first coupling module and the second coupling module are initiated in a power saving mode when no data traffic is detected on the given channel. The remaining channels of the plurality of channels between the first coupling module and the second coupling module are activated in an operational mode for data transfer when data traffic is detected on the given channel.

Yet another example aspect of the present disclosure is directed to a method. The method includes receiving, by a first coupling module, a power-on signal from a first electronic device coupled to the first coupling module. The method also includes relaying, by the first coupling module, a first optical signal to a second coupling module coupled to a second electronic device. The method also includes relaying, by the second coupling module, in response to receipt of the first optical signal, a second optical signal to the first coupling module. The method also includes activating, by the first coupling module, in response to receipt of the second optical signal, a data transfer circuit for relaying data via an optical communication interface between the first coupling module and the second coupling module.

In some example embodiments, the first optical signal is indicative of the power-on signal received from the first electronic device and detected by one or more pins of a connector between the first coupling module and the first electronic device.

In some example embodiments, the second optical signal is indicative of a hot plug detect (HPD) signal received from the second electronic device.

In some example embodiments, the method includes applying the power-on signal from the first electronic device to a source-side circuit in the first coupling module. In some example embodiments, the method also includes using the source-side circuit in the first coupling module to generate the first optical signal. For example, the source-side circuit in the first coupling module is configured to receive the second optical signal and initiate activation of the data transfer circuit for relaying data between the first coupling module and second coupling module.

In some example embodiments, the method includes receiving the first optical signal at a sink-side circuit in the second coupling module and using the sink-side circuit to translate the first optical signal into a power-on signal for the second electronic device. For example, the method can include receiving, by the sink-side circuit, a hot plug detect (HDP) signal from the second electronic device and using the sink-side circuit to translate the HDP signal into the second optical signal.

In some example embodiments, the method includes waiting for a first settling time to elapse between receiving the power-on signal from the first electronic device and relaying the first optical signal from the first coupling module to the second coupling module.

In some example embodiments, the method includes waiting for a second settling time to elapse between receiving the second optical signal and relaying data between a source transceiver in the first coupling module and a sink transceiver in the second coupling module.

In some example embodiments, the method includes relaying, by first coupling module, data from the first electronic device to the second coupling module for receipt at the second electronic device.

In some example embodiments, the first optical signal and the second optical signal are relayed over an optical fiber cable coupled between the first coupling module and the second coupling module.

In some example embodiments, the optical fiber includes a first optical fiber and a light-emitting element, the first coupling module comprises a first transceiver, the second coupling module comprises a second transceiver, and a light emitted by the light-emitting element corresponds to one or more characteristics of the first transceiver or the second transceiver.

In some example embodiments, the one or more characteristics include a vibration level.

In some example embodiments, the first transceiver includes a light-control circuit that is configured to control one or more of a type of light, a frequency, a brightness, a color, or a number of lights emitted by the light-emitting element.

A still further example aspect of the present disclosure is directed to an optical communication interface system that includes a first coupling module, a second coupling module, and a cable coupled between the first coupling module and the second coupling module. The first coupling module includes a first device connector for coupling to a first electronic device, a source transceiver configured to relay data associated with the first electronic device, and a source-side circuit configured to receive a power-on signal from the first electronic device and generate a first optical signal for relay from the first coupling module to a second coupling module. The second coupling module includes a second device connector for coupling to a second electronic device, a sink transceiver configured to relay data associated with the second electronic device, and a sink-side circuit configured to receive the first optical signal and to generate a second optical signal for relay from the second coupling module to the first coupling module. The cable includes one or more optical fibers and is configured to provide data transmission and reception over a plurality of channels between the first coupling module and the second coupling module upon receipt of the second optical signal by the first coupling module.

In some example embodiments, the first optical signal is indicative of the power-on signal received from the first electronic device as detected by one or more pins of the first device connector.

In some example embodiments, the second optical signal is indicative of a hot plug detect (HPD) signal received from the second electronic device as detected by one or more pins of the second device connector.

In some example embodiments, the source-side circuit in the first coupling module is configured to receive the second optical signal and initiate activation of a data transfer circuit for relaying data between the first coupling module and second coupling module.

In some example embodiments, the sink-side circuit in the second coupling module is configured to receive the first optical signal and translate the first optical signal into a power-on signal for the second electronic device.

In some example embodiments, the second coupling circuit includes a diode to prevent reverse power from the power-on signal for the second electronic device from flowing back into the sink-side circuit.

In some example embodiments, the sink-side circuit in the second coupling module is configured to receive a hot plug detect (HDP) signal from the second electronic device and translate the HDP signal into the second optical signal.

In some example embodiments, the source-side circuit of the first coupling module is configured to wait for a first settling time to elapse between receiving the power-on signal from the first electronic device and relaying the first optical signal from the first coupling module to the second coupling module.

In some example embodiments, the source-side circuit of the first coupling module is configured to wait for a second settling time to elapse between receiving the second optical signal and relaying data between the source transceiver in the first coupling module and the sink transceiver in the second coupling module.

In some example embodiments, the source transceiver of the first coupling module is configured to both transmit optical audio/video signals to the sink transceiver of the second coupling module via the one or more optical fibers and to receive optical audio/video signals from the sink transceiver. Similarly, the sink transceiver of the second coupling module is configured to both transmit optical audio/video signals to the source transceiver of the first coupling module via the one or more optical fibers and to receive optical audio/video signals from the source transceiver.

In some example embodiments, the one or more optical fibers are configured to transmit and receive data of a corresponding bidirectional data communication channel of a plurality of bidirectional data communication channels between the first coupling module and the second coupling module.

In some example embodiments, the cable coupled between the first coupling module and the second coupling module includes a first set of optical fibers and a second set of optical fibers. The first set of optical fibers is configured for single direction data transmission of data communication channels from the first coupling module to the second coupling module. The second set of optical fibers is configured for single direction data transmission of data communication channels from the second coupling module to the first coupling module.

In some example embodiments, the cable includes a light-emitting element, and a light emitted by the light-emitting element corresponds to one or more characteristics of the source transceiver or the sink transceiver.

In some exemplary embodiments, the source transceiver includes a first transmitter and a light-control circuit coupled to the first transmitter, the light-emitting element partially or fully surrounds the one or more optical fibers, and a light emitted by the light-emitting element corresponds to one or more characteristics associated with the first transceiver or the second transceiver.

In some exemplary embodiments, the source transceiver includes a vibration sensor configured to communicate a vibration level to the light-control circuit, and the one or more characteristics include the vibration level communicated from the vibration sensor to the light-control circuit.

In some exemplary embodiments, the one or more characteristics include one or more of a data transmitting rate, a clock rate, an image resolution, a power level, a temperature, a vibration level, or a content associated with data transmission over the one or more optical fibers.

Another example aspect of the present disclosure is directed to an optical communication interface. The optical communication interface includes a cable including a first optical fiber and a light-emitting element. The optical communication interface includes a first transceiver including a first transmitter configured to receive an input data, convert the input data to a first optical signal, and transmit the first optical signal through the first optical fiber; and a light-control circuit coupled to the first transmitter, the light-control circuit configured to control the light-emitting element. The optical communication interface includes a second transceiver including a first receiver configured to receive the first optical signal. The light-emitting element partially or fully surrounds the first optical fiber. A light emitted by the light-emitting element corresponds to one or more characteristics associated with the first transceiver or the second transceiver. The one or more characteristics include a vibration level.

Another example aspect of the present disclosure is directed to an optical communication interface. The optical communication interface includes a cable including a first optical fiber. The optical communication interface includes a first transceiver including a first transmitter configured to: receive an input data; convert the input data to a first optical signal; transmit the first optical signal through the first optical fiber; and transmit a second optical signal through a second optical fiber. The optical communication interface includes a second transceiver including a first receiver configured to receive the first optical signal and the second optical signal. The second optical signal is converted into an electrical signal which is used as a power source for the first receiver.

Another example aspect of the present disclosure is directed to an optical communication interface. The optical communication interface includes a cable including a first optical fiber and a light-emitting element. The optical communication interface includes a first transceiver. The first transceiver includes a first transmitter configured to receive an input data, convert the input data to a first optical signal, and transmit the first optical signal through the first optical fiber; and a light-control circuit coupled to the transmitter, the light-control circuit configured to control the light-emitting element; and a vibration sensor configured to communicate a vibration level to the light-control circuit. The optical communication interface includes a second transceiver including a first receiver configured to receive the first optical signal. The light-emitting element partially or fully surrounds the first optical signal. A light emitted by the light-emitting element corresponds to one or more characteristics associated with the first transceiver or the second transceiver.

Other example aspects of the present disclosure are directed to systems, methods, apparatuses, and communication interfaces.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

The foregoing aspects and many of the attendant advantages of this application will become more readily appreciated as the same becomes better understood by reference to the following detailed description, when taken in conjunction with the accompanying drawings, wherein.

DETAILED DESCRIPTION

Figure 1:
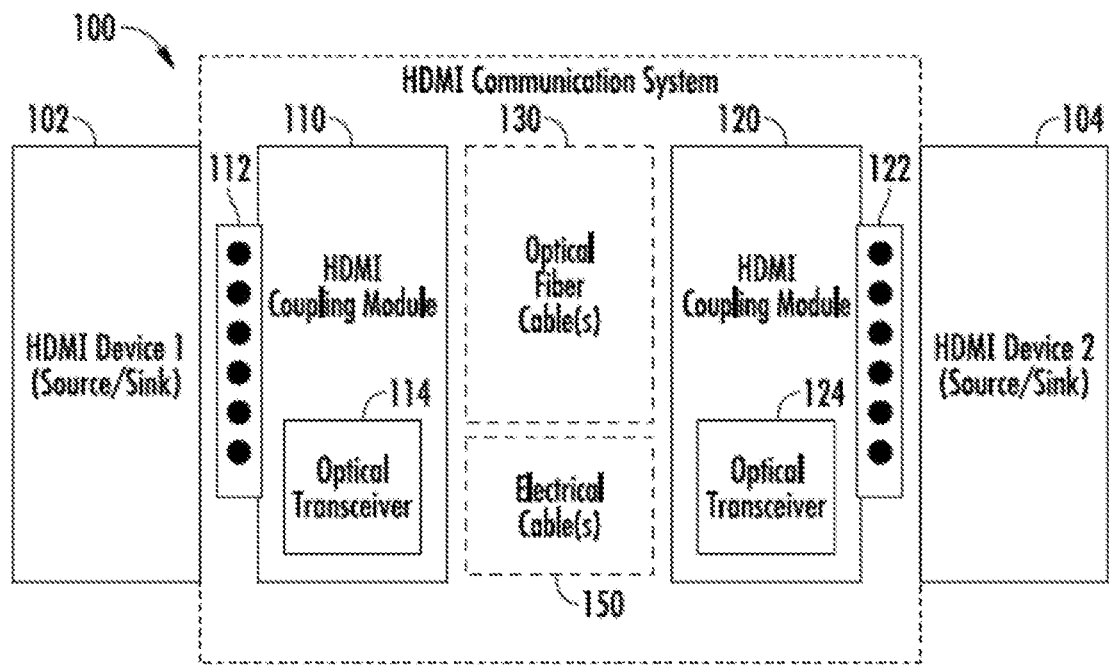
FIGS. 1-4 depict block diagrams of example aspects of a bidirectional communication system according to example aspects of the present disclosure.

Example aspects of the present disclosure are directed to communication using protocols such as HDMI. Such technology can include systems, methods, apparatuses, and/or communication interfaces that are intended to provide a structured framework for communicating between HDMI devices in a manner that generally improves various aspects (e.g., power, form factor, convenience, etc.) of overall communication. The devices, systems, and methods of the present disclosure can provide a number of technical effects and benefits. Although description herein focuses on a communication interface in the context of HDMI operation, it should be appreciated that aspects of the disclosure could also equally apply to USB, DP, DVI, VGA, or other types of communication interfaces.

More particularly, according to some examples, an HDMI communication system can provide a data communication interface between a first HDMI device (e.g., a laptop) and a second HDMI device (e.g., a monitor). In general, an HDMI communication system can include a first HDMI coupling module that includes a first device connector for coupling to the first HDMI device, and a second HDMI coupling module that includes a second device connector for coupling to the second HDMI device. An HDMI communication system can also include one or more optical fiber cables coupled between the first and second HDMI coupling modules and configured to provide a plurality of data communication channels between the first and second HDMI coupling modules. As described throughout this disclosure, an optical communication system or an optical coupling module can be full-optical (i.e., only optical fibers are used between two ends of a connection) or hybrid (i.e., a combination of optical fibers and electrical wires between two ends of a connection).

In accordance with one example aspect of the disclosed technology, an HDMI communication system can be configured for dual direction functionality. Some conventional HDMI communication systems require that one end of an HDMI cable be connected to a source device, while the other end of an HDMI cable be connected to a sink device. For these conventional HDMI cables, the source side cable circuitry is designed for data transmission functionality only, while sink side circuitry is designed for data reception functionality only. As such, if the source side of the cable is connected to the sink device and/or if the sink side of the cable is connected to the source device, proper operation of the communication system will not be achieved. By designing an HDMI communication system with dual optical-transceivers and related circuitry provided at both source and sink sides of a system, it will not matter which end of an HDMI cable is plugged into a sink device and which end of an HDMI cable is plugged into a source device. Both ends of the cable are configured for both data transmission and reception. Ease of use, connection flexibility, and increased likelihood of functionality are all potential improvements realized by communication systems as described herein that provide dual direction functionality.

Another example aspect of the disclosed technology is directed to an optical HDMI communication system that has a connector that is detachable from the fiber optic cable. For example, an HDMI communication system can include first and second HDMI coupling modules. Each coupling module can include a device connector for coupling to an HDMI device and a cable connector for coupling to a fiber optic cable. At least one of the cable connectors can be detachable from the optical fiber cable. For example, in some implementations, both of a first cable connector and a second cable connector are configured to be detachable from the optical fiber cable. Such a configuration can advantageously provide design flexibility and/or system customization by allowing for interchangeability of optical cables having different lengths as suited for different applications. For instance, some applications requiring longer distance transmission may require an optical cable having greater size or functionality, and vice versa for other applications. By creating an HDMI communication system with detachable components, plug and play design can be achieved, offering numerous technical advantages and overall design flexibility. As another example, a detachable connector allows a coupling module to stay plugged to the corresponding source/sink device for ease of moving the source/sink device without a need to carry an optical fiber cable.

Another example aspect of the disclosed technology is directed to an HDMI communication system that has power saving features. An HDMI communication system with power saving features can advantageously reduce system wear and tear, decrease overall power consumption and operational costs for connected HDMI devices, and improve HDMI communication system efficiency.

In some examples, power saving features can be provided by way of a switch (e.g., touch sensor) that is provided at one or more of a first or second HDMI coupling module. For instance, a touch sensor can be provided that is configured to toggle data transmission over an optical fiber cable between first and second coupling modules on and off. In some examples, the touch sensor is positioned on a circuit housing of a given HDMI coupling module. Provision of such a touch sensor can provide a manual power saving option to the system. In addition, an HDMI communication system can be switched on and/or off without actually unplugging the cable, and therefore reducing wear and tear.

In other power saving implementations of the disclosed technology, one or more channels of a plurality of channels in a fiber optic cable are operated in a power saving mode when there is no data to transmit between the first HDMI coupling module and the second HDMI coupling module.

More particularly, in some implementations, power saving features can be provided at the transmitter side of an HDMI communication system. In one example, a first HDMI coupling module (e.g., transmitter module) can receive a plurality of data signal lines from a first HDMI device (e.g., source device) and generate a control signal to operate one or more channels of the plurality of channels in a power saving mode when one or more data signal lines of the plurality of data signal lines from the first HDMI device indicate that no data is available. In another example, a first HDMI coupling module can be configured to monitor the presence of data on a plurality of data signal lines from the first HDMI device. When no data has been present on one or more data signal lines of the plurality of data signal lines for a threshold amount of time, one or more channels associated with the one or more data signal lines can be configured to operate in a power saving mode.

Still further, in some implementations, power saving features can be provided at the receiver side of an HDMI communication system. For example, a second HDMI coupling module (e.g., receiver module) can include a power saving circuit configured to monitor a given channel of a plurality of channels between a first HDMI coupling module and a second HDMI coupling module, the given channel designated in an operational mode for traffic detection. When no data traffic is detected on the given channel, operation of the remaining channels of the plurality of channels between the first HDMI coupling module and the second HDMI coupling module can be initiated in a power saving mode. When data traffic is detected on the given channel, the remaining channels of the plurality of channels between the first HDMI coupling module and the second HDMI coupling module can be initiated in an operational mode for data transfer.

Still further technical effects and benefits of the disclosed technology can be realized through systems and methods that provide an all optical power-on sequence for an HDMI communication system. This arrangement helps to coordinate signals associated with operational confirmation, especially with an all optical HDMI communication system. By removing or reducing the use of electrical signals between first and second ends of an HDMI cable, greater realizing of the benefits of optical transmission (e.g., thin cables, greater signal stability over longer data communication distances, without need for external power) can be realized and maintained.

Example aspects of the present disclosure are further directed to optical communication interfaces equipped with various features, including feature lighting, power over fiber, and vibration sensing capabilities. For example, a feature lighting equipped cable can generate feature lights based on the signal transmitted, such as the data transmitted over the cable. In some implementations, a vibration sensor can obtain a vibration level associated with the cable, and the feature lights can be emitted based on the vibration level. Further, example aspects of the present disclosure allow for power-over-fiber to be provided to power a receiver of the interface, such as an audio-visual (A/V) or sideband receiver.

The devices, systems, and methods of the present disclosure can provide a number of technical effects and benefits. For example, the feature lights according to example aspects of the present disclosure can allow for a visual indication of the data being transmitted over the cable to be provided to a user. For example, a HDMI cable with a feature light can allow a user to quickly ascertain the resolution of an image transmitted over the cable, such as during playback of A/V media.

Moreover, the devices, systems, and methods of the present disclosure can allow for improved techniques to provide power to a receiver of a cable. For example, light transmitted over an optical fiber can be converted into an electrical signal suitable for providing power to a receiver of a cable, such as an A/V or sideband receiver. In some implementations, this may eliminate the need for a separate power source, such as a power source provided by a sink device (e.g., a television or display monitor).

With reference to the figures, example embodiments of the present disclosure will be discussed in further detail. FIG. 1 depicts aspects of a bidirectional HDMI communication system 100 according to example aspects of the present disclosure. HDMI communication system 100 is generally configured to serve as an optical communication interface between a first HDMI device 102 and a second HDMI device 104. First HDMI device 102 and second HDMI device 104 can include various devices, such as but not limited to source devices (e.g., Blu-Ray Disc Player, laptop, personal computer, game console, etc.) and/or sink devices (e.g., TV, display monitor, etc.).

Referring still to FIG. 1, HDMI communication system 100 can include a first HDMI coupling module 110, a second HDMI coupling module 120, and optical fiber cable(s) 130. The first HDMI coupling module 110 can include a first connector 112 for coupling to the first HDMI device 102 and a first optical transceiver 114 that is configured for use as either a sink (i.e., receiver) or source (i.e., transmitter). The second HDMI coupling module 120 can include a second connector 122 for coupling to a second HDMI device 104 and a second optical transceiver 124 that is configured for use as either a sink or source transceiver. When acting as a transmitter, an optical transceiver receives one or more electrical signals from a source HDMI device, and converts the one or more electrical signals into one or more optical signals (e.g., by using a driver circuitry to drive one or more light sources such as a light emitting diode or laser). When acting as a receiver, an optical transceiver receives one or more optical signals (e.g., by using a photodiode), and converts the one or more optical signals into one or more electrical signals to be provided to a sink device (e.g., by using transimpedance amplifier to convert a photo-current to a voltage).

Optical fiber cable(s) 130 can be coupled between the first HDMI coupling module 110 and the second HDMI coupling module 120 and can correspond to a cable that includes one or more optical fibers. Optical fiber cable(s) 130 can be further configured to provide both data transmission and reception over a plurality of channels between the first HDMI coupling module 110 and the second HDMI coupling module 120. For example, an HDMI cable can include four data channels and one or more sideband channels for exchanging information such as power information, ARC/eARC (audio return channel), SCL (clock in display data channel), SDA (data in display data channel), CEC (consumer electronics control), HPD (hot-plug detect), etc. Each channel can be implemented using a separate optical fiber, or can be implemented using a single optical fiber with a wavelength/time/code division multiplexing/demultiplexing scheme. The first HDMI coupling module 110 and second HDMI coupling module 120 serve as connector devices disposed on opposite ends of the optical fiber cable(s) 130.

In some implementations, the HDMI communication system 100 may be a hybrid implementation, where one or more electrical cables 150 are coupled between the first HDMI coupling module 110 and the second HDMI coupling module 120. For example, the higher-speed bidirectional data communication channels 135 (as described in reference to FIG. 2) can be implemented using optical means (e.g., optical transceivers coupled with optical fiber(s)), and the lower-speed data (e.g., CEC, utility, HPD, DDC, etc.) can be implemented using electrical means (e.g., electrical transceivers coupled with electrical wire(s) such as copper wires).

In accordance with an example aspect of the disclosed technology, HDMI communication system 100 can be configured for dual direction functionality. As such, if first HDMI device 102 is configured for operation as a source device (e.g., a television, laptop, gaming system, etc.) and second HDMI device 104 is configured for operation as a sink device (e.g., a monitor or other display device), HDMI communication system 100 will provide the same functionality whether first connector 112 is physically coupled to the first HDMI device 102 and second connector 122 is physically coupled to the second HDMI device 104 or first connector 112 is physically coupled to the second HDMI device 104 and second connector 122 is physically coupled to the first HDMI device 102. Because HDMI communication system 100 has dual transceivers embodied by first optical transceiver 114 and second optical transceiver 124 and related circuitry (e.g., as depicted in FIG. 2) provided at both source and sink sides of a system (e.g., in first HDMI coupling module 110 and in second HDMI coupling module 120), it will not matter which side of an HDMI cable embodied by HDMI communication system 100 is plugged into a sink device and which side is plugged into a source device.

Both sides of the HDMI communication system 100 (e.g., both first HDMI coupling module 110 and second HDMI coupling module 120) are configured for both data transmission and reception. More particularly, the first optical transceiver 114 of first HDMI coupling module 110 is configured to both transmit optical audio/video signals to the second optical transceiver 124 of the second HDMI coupling module 120 via the optical fiber cable(s) 130 and to receive optical audio/video signals from the second optical transceiver 124. Similarly, the second optical transceiver 124 is configured to both transmit optical audio/video signals to the first optical transceiver 114 via the optical fiber cable(s) 130 and to receive optical audio/video signals from the first optical transceiver 114.

Figure 5:
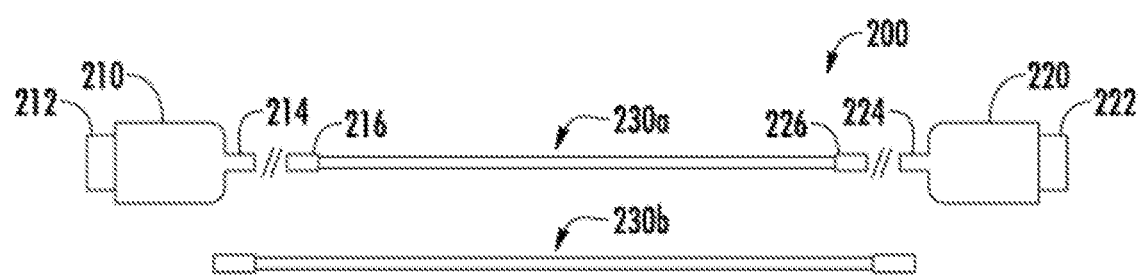
FIG. 5 depicts a block diagram of an example detachable communication system according to example aspects of the present disclosure.
Figure 6:
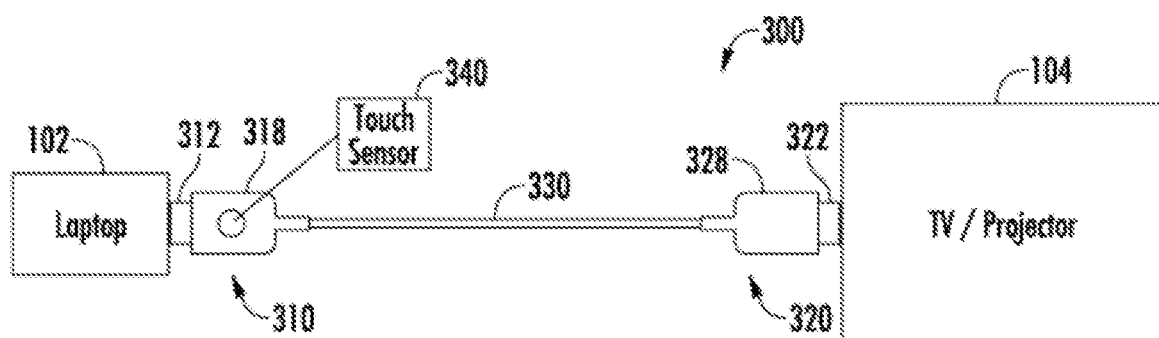
FIG. 6 depicts a block diagram of an example power saving communication system according to example aspects of the present disclosure.

In some implementations, as shown in FIG. 5 herein, at least one of the first HDMI coupling module 110 or the second HDMI coupling module 120 is detachable from the optical fiber cable(s) 130. In still further implementations, as shown in FIG. 6 herein, at least one of the first HDMI coupling module 110 or the second HDMI coupling module 120 can include a switch (e.g., touch sensor) configured to toggle data transmission over the optical fiber cable on and off.

Figure 2:
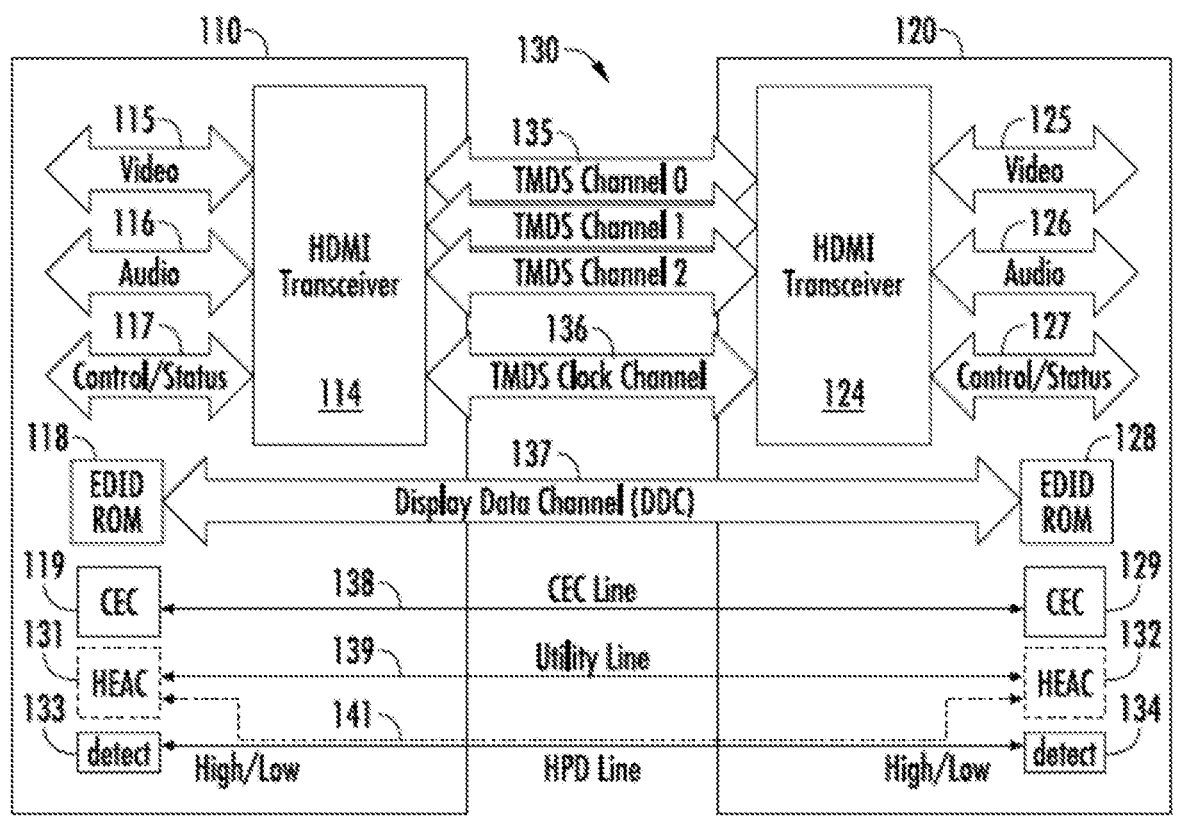
Figure 3:
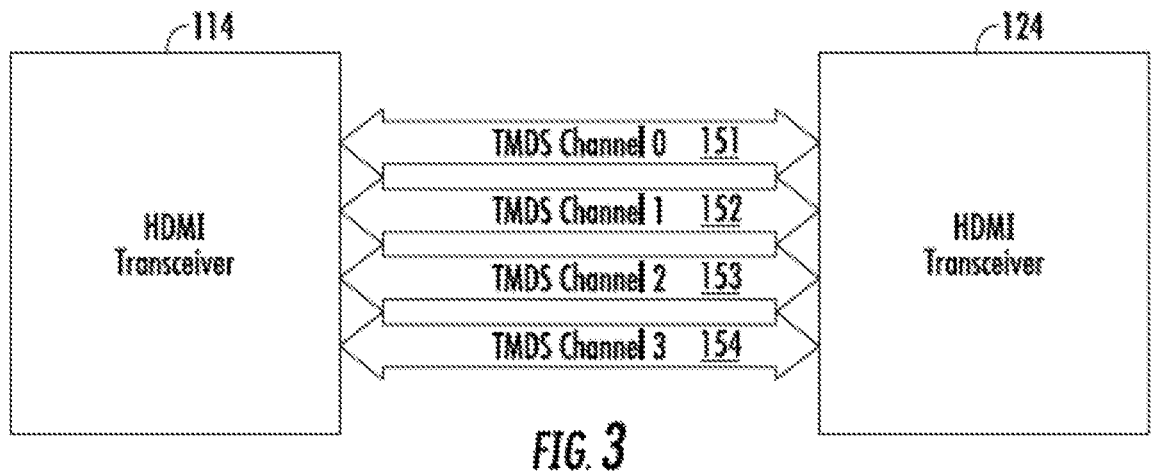
Figure 4:
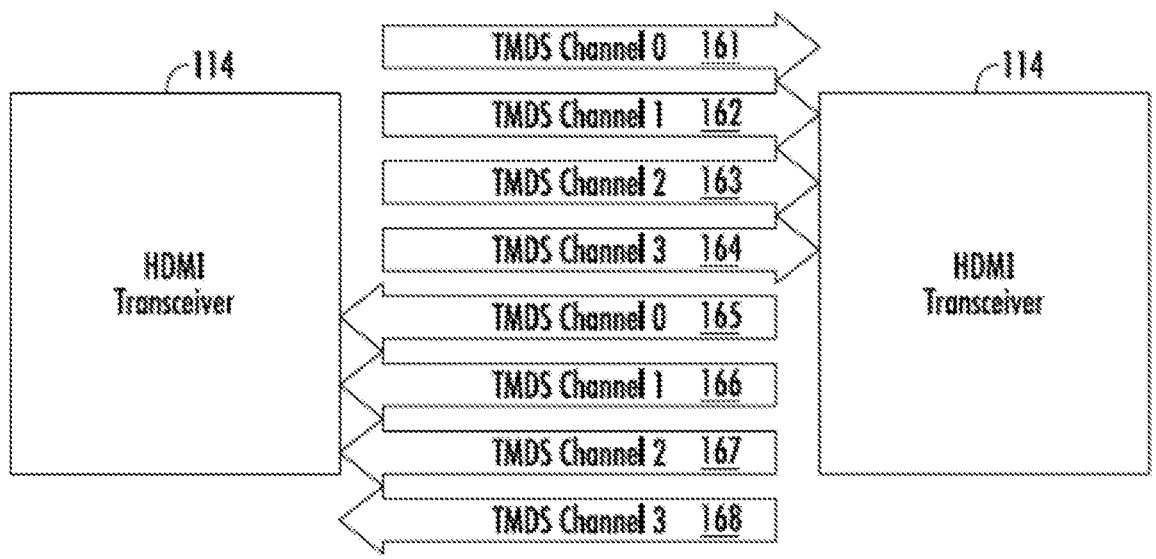

FIGS. 2-4 depict still further aspects of a bidirectional HDMI communication system according to example aspects of the present disclosure, such as can be incorporated with HDMI communication system 100 depicted in FIG. 1.

With more particular reference to FIG. 2, first HDMI coupling module 110 and second HDMI coupling module 120 are both depicted as having similar components. For example, first HDMI coupling module 110 includes first optical transceiver 114 and related circuitry, while second HDMI coupling module 120 includes second optical transceiver 124 and related circuitry. First optical transceiver 114 is configured to both transmit and receive video signals 115, audio signals 116, and control status signals 117 to and from a first HDMI device (e.g., first HDMI device 102 of FIG. 1). Second optical transceiver 124 is configured to both transmit and receive video signals 125, audio signals 126, and control status signals 127 to and from a second HDMI device (e.g., second HDMI device 104 of FIG. 1).

Referring still to FIG. 2, the first HDMI coupling module 110 can include a first non-transitory computer-readable storage medium 118 configured to store Extended Display Identification Data (EDID) indicative of the display capabilities of the first HDMI device (e.g., first HDMI device 102 of FIG. 1). In some instances, such EDID information stored in the first non-transitory computer-readable storage medium 118 can be particularly valuable when the first HDMI device (e.g., first HDMI device 102 of FIG. 1) is configured to serve as a sink device. The second HDMI coupling module 120 can include a second non-transitory computer-readable storage medium 128 configured to store Extended Display Identification Data (EDID) indicative of the display capabilities of the second HDMI device (e.g., second HDMI device 104 of FIG. 1). In some instances, such EDID information stored in the second non-transitory computer-readable storage medium 128 can be particularly valuable when the second HDMI device (e.g., second HDMI device 104 of FIG. 1) is configured to serve as a sink device.

In some implementations, both first HDMI coupling module 110 and second HDMI coupling module 120 can each include a respective CEC control circuit 119, 129, directed to relaying and coordinating consumer electronics control (CEC) functionality between first HDMI device 102 and second HDMI device 104. In some implementations, both first HDMI coupling module 110 and second HDMI coupling module 120 can each include a respective HDMI Ethernet and Audio Return Channel (HEAC) circuit 131, 132 directed to provide Ethernet compatible data networking between connected devices (e.g., first HDMI device 102 and second HDMI device 104 of FIG. 1) and an audio return channel in both directions. The HEAC circuits 131, 132 can also use a Hot-Plug Detect (HPD) line for signal transmission. In still further implementations, both first HDMI coupling module 110 and second HDMI coupling module 120 can each include a respective HDP detect circuit 133, 134 to communicate confirmation of power signals received at one or more pins of the connectors (e.g., first connector 112 and/or second connector 122 of FIG. 1) coupled to the HDMI devices (e.g., first HDMI device 102 and second HDMI device 104 of FIG. 1).

Referring still to FIG. 2, a plurality of channels can be provided over the optical fiber cable(s) 130 to provide the depicted functionality between first HDMI coupling module 110 and second HDMI coupling module 120. For instance, communication between first HDMI coupling module 110 and second HDMI coupling module 120 over optical fiber cable(s) 130 can include a plurality of bidirectional data communication channels 135 configured to transmit and receive data between the first HDMI coupling module 110 and the second HDMI coupling module 120 and one or more clock channels 136. In some examples, bidirectional data communication channels 135 and/or the one or more clock channels 136 can be configured to relay data formatted using a Transition-Minimized Differential Signaling (TMDS) protocol. Additional channels for communication between first HDMI coupling module 110 and second HDMI coupling module 120 can include but are not limited to: a Display Data Channel (DDC) line for communicating between first non-transitory computer-readable storage medium 118 and second non-transitory computer-readable storage medium 128; a CEC line 138 for communication between first CEC control circuit 119 and second CEC control circuit 129; a utility line 139 for communicating between first HEAC circuit 131 and second HEAC circuit 132; and an HPD line for communicating between first HEAC circuit 131 and first detect circuit 133 and second HEAC circuit 132 and second detect circuit 134. In some implementations, the HDMI coupling modules 110 and 120 can be a hybrid implementation, where the video and audio data is transmitted via one or more optical fibers, and other control data (e.g., CEC, DDC, Utility, and/or HDP, etc.) is transmitted via one or more electrical wires. In some other implementations, the HDMI coupling modules 110 and 120 can be a full-optical implementation, where the video and audio data and the control data is transmitted via one or more optical fibers.

Referring now to FIGS. 3-4, additional discussion of how optical fiber cable(s) 130 can include HDMI channels between a first HDMI coupling module 110 and second HDMI coupling module 120 that are configured for bidirectional communication.

More particularly, FIG. 3 depicts aspects of a dual direction HDMI communication system, whereby optical fiber cable(s) 130 can include a plurality of bidirectional data communication channels 151-154 that are configured to both transmit and receive data in both directions between a first optical transceiver 114 associated with the first HDMI coupling module 110 and a second optical transceiver 124 associated with the second HDMI coupling module 120. In some instances, bidirectional data communication channels 151-154 can include at least three optical channels configured to relay data formatted using a Transition-Minimized Differential Signaling (TMDS) protocol. In some examples, a first bidirectional data communication channel 151, second bidirectional data communication channel 152, and third bidirectional data communication channel 153 of FIG. 3 can correspond to the data channels 135 provided over optical fiber cable(s) 130 of FIG. 2, while fourth bidirectional data communication channel 154 of FIG. 3 can correspond to the clock channel 136 of FIG. 2.

In FIG. 4, optical fiber cable(s) 130 can include a first set of optical fibers configured for single direction data transmission of data communication channels 161-164 from the first optical transceiver 114 of first HDMI coupling module 110 to second optical transceiver 124 of the second HDMI coupling module 120, and a second set of optical fibers configured for single direction data transmission of data communication channels 165-168 from second optical transceiver 124 of second HDMI coupling module 120 to the first optical transceiver 114 of the first HDMI coupling module 110. In some implementations, data communication channels 161-164 over the first set of optical fibers can include at least three optical channels configured to relay data and one or more clock channels formatted using a Transition-Minimized Differential Signaling (TMDS) protocol. Similarly, data communication channels 165-168 over the second set of optical fibers can include at least three optical channels configured to relay data and one or more clock channels formatted using a Transition-Minimized Differential Signaling (TMDS) protocol and one or more clock.

FIG. 5 depicts a block diagram of an example detachable HDMI communication system 200 according to example aspects of the present disclosure. Detachable HDMI communication system 200 is generally configured to serve as an optical communication interface between first and second HDMI devices (e.g., first HDMI device 102 and second HDMI device 104 of FIG. 1). Detachable HDMI communication system 200 can include a first HDMI coupling module 210, a second HDMI coupling module 220, and cable(s) 230a/230b. First HDMI coupling module 210 of FIG. 5 can include some or all of the features and functionality of first HDMI coupling module 110 depicted in FIGS. 1-2 or can include different features and functionality. Second HDMI coupling module 220 of FIG. 5 can include some or all of the features and functionality of second HDMI coupling module 120 depicted in FIGS. 1-2 or can include different features and functionality. Cable(s) 230a/230b depicted in FIG. 5 can include some or all of the features and functionality of optical fiber cable(s) 130 and electrical wires 150 depicted in FIGS. 1-2 or can include different features and functionality. Detachable HDMI communication system 200 can also include some or all of the data channel configurations depicted in FIGS. 3-4 or can include different channel structure and function.

In some implementations, first HDMI coupling module 210 of FIG. 5 can include a first device connector 212 for coupling to a first HDMI device (e.g., first HDMI device 102 of FIG. 1) and a first cable connector 214 for coupling to an optical fiber cable 230a/230b. Second HDMI coupling module 220 of FIG. 5 can include a second device connector 222 for coupling to a second HDMI device (e.g., second HDMI device 104 of FIG. 1) and a second cable connector 224 for coupling to an optical fiber cable 230a/230b.

Referring still to FIG. 5, the detachable HDMI communication system 200 can be configured where at least one of the first cable connector 214 or the second cable connector 224 is detachable from the optical fiber cable 230a/230b. In some implementations, the first cable connector 214 is configured such that the first HDMI coupling module 210 is detachable from the optical fiber cable 230a/230b and the second cable connector 224 is configured such that the second HDMI coupling module 220 is detachable from the optical fiber cable 230a/230b. For instance, first cable connector 214 and a first end connector 216 of optical fiber cable 230a/230b can provide opposite nominal genders of connector types. For instance, first cable connector 214 can provide a plug-type connector adapted for mated positioning relative to a first end connector 216 of optical fiber cable 230a/230b that can provide a socket-type receptacle. Similarly, second cable connector 224 can provide a plug-type connector adapted for mated positioning relative to a first end connector 226 of optical fiber cable 230a/230b that can provide a socket-type receptacle. Other types of connections can be used including, but not limited to, magnetic connections.

In some implementations, detachable HDMI communication system 200 can include different optical fiber cables for different applications. For instance, detachable HDMI communication system 200 can include a first optical fiber cable 230a characterized by a first length, wherein the first optical fiber cable 230a is configured for coupling to the first cable connector 214 of the first HDMI coupling module 210 and to the second cable connector 224 of the second HDMI coupling module 220, the first optical fiber cable 230a configured for use in a first optical data application. Detachable HDMI communication system 220 can also include a second optical fiber cable 230b characterized by a second length that is different than the first length of first optical fiber cable 230a. The second optical fiber cable 230b can be configured for coupling to the first cable connector 214 of the first HDMI coupling module 210 and to the second cable connector 224 of the second HDMI coupling module 220, the second optical fiber cable 230b configured for use in a second optical data application.

In some implementations, such as when the detachable HDMI communication system 200 of FIG. 5 includes some or all of the features and functionality of HDMI communication system 100 of FIG. 1, the first HDMI coupling module 210 can include a first optical transceiver (e.g., first optical transceiver 114 of FIG. 1) that is configured for use as either a sink or source transceiver. Second optical coupling module 220 can include a second optical transceiver (e.g., second optical transceiver 124) that is configured for use as either a sink or source transceiver. The optical fiber cable 230a/230b that is detachably coupled between the first HDMI coupling module 210 and the second HDMI coupling module 220 can be configured to provide data transmission over a plurality of channels between the first HDMI coupling module 210 and the second HDMI coupling module 220. More particularly, the first optical transceiver within first HDMI coupling module 210 can be configured to both transmit optical audio/video signals to the second optical transceiver within second HDMI coupling module 220 via the optical fiber cable 230a/230b and to receive optical audio/video signals from the second optical transceiver within second HDMI coupling module 220. The second optical transceiver within second HDMI coupling module 220 can be configured to both transmit optical audio/video signals to the first optical transceiver within second HDMI coupling module 220 via the optical fiber cable 230a/230b and to receive optical audio/video signals from the first optical transceiver within first HDMI coupling module 210.

In some implementations, as greater appreciated relative to FIG. 3, optical fiber cable 230a/230b detachably coupled between the first HDMI coupling module 210 and the second HDMI coupling module 220 can include a plurality of bidirectional data communication channels configured to either transmit or receive data between the first HDMI coupling module 210 and the second HDMI coupling module 220. In some implementations, as shown in FIG. 4, the optical fiber cable 230a/230b can include a first set of data communication channels configured for single direction data transmission from the first HDMI coupling module 210 to the second HDMI coupling module 220 and a second set of data communication channels configured for single direction data transmission from the second HDMI coupling module 220 to the first HDMI coupling module 210.

In some implementations, as shown in FIG. 6, at least one of the first HDMI coupling module 210 or the second HDMI coupling module 220 can include a touch sensor configured to toggle data transmission on and off. The touch sensor can include, for example, a soft button on a user interface, a hard button, a switch, a sensor configured for gesture recognition, a remote-controlled switch, and/or other types of switch interface.

FIG. 6 depicts a block diagram of a first example power saving HDMI communication system 300 according to example aspects of the present disclosure. HDMI communication system 300 is generally configured to serve as an optical communication interface between first and second HDMI devices (e.g., first HDMI device 102 and second HDMI device 104 of FIG. 1). HDMI communication system 300 can include a first HDMI coupling module 310, a second HDMI coupling module 320, a cable 330, and a touch sensor 340. The first HDMI coupling module 310 can include a first device connector 312 for coupling to a first HDMI device (e.g., first HDMI device 102 of FIG. 1). First HDMI coupling module 310 can also include a first HDMI coupling circuit including data relay circuitry (e.g., some or all of the circuitry depicted in first HDMI coupling module 110 of FIG. 2) and a first circuit housing 318 substantially encasing the first HDMI coupling circuit. Second HDMI coupling module 320 can include a second device connector 322 for coupling to a second HDMI device (e.g., second HDMI device 104 of FIG. 1). Second HDMI coupling module 320 can also include a second HDMI coupling circuit including data relay circuitry (e.g., some or all of the circuitry depicted in second HDMI coupling module 120 of FIG. 2) and a second circuit housing 328 substantially encasing the second HDMI coupling circuit. The cable 330 coupled between the first HDMI coupling module 310 and the second HDMI coupling module 320 can include some or all of the features and functionality of optical fiber cable(s) 130 and electrical wires 150 depicted in FIGS. 1-2, and can be configured to provide data transmission over a plurality of channels between the first HDMI coupling module 310 and the second HDMI coupling module 320. The touch sensor 340 can be integrated into the first circuit housing 318 and/or the second circuit housing 328. The touch sensor 340 can be positioned on at least one of the first circuit housing 318 or the second circuit housing 328. Although FIG. 6 depicts touch sensor 340 on first circuit housing 318, touch sensor 340 could be additionally or alternatively positioned on second circuit housing 328. The touch sensor 340 can include, for example, a soft button on a user interface, a hard button, a switch, a sensor configured for gesture recognition, and/or other types of switch interface. The touch sensor 340 can be configured to toggle data transmission on and off over the plurality of channels through optical fiber cable 330 between the first HDMI coupling module 310 and the second HDMI coupling module 320. For example, the touch sensor 340 may be electrically coupled to a power management circuitry of the coupling module 310 to control the coupling module 310. When the data transmission in HDMI communication system 300 is toggled on via touch sensor 340, then data channels within optical fiber cable 330 are configured in an operational mode for active data relay. When the data transmission in HDMI communication system 300 is toggled off via touch sensor 340, then data channels within optical fiber cable 330 are configured in an inactive or sleep mode with no active data transfer.

Figure 7:
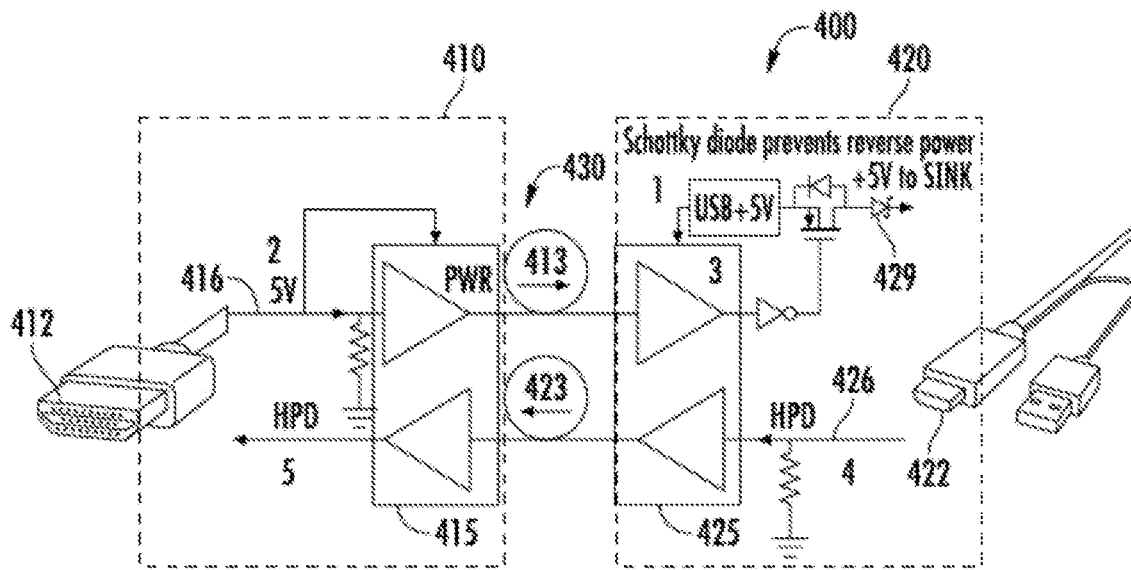
FIG. 7 depicts a schematic diagram of an example power-on circuit for a communication system according to example aspects of the present disclosure.
Figure 8:
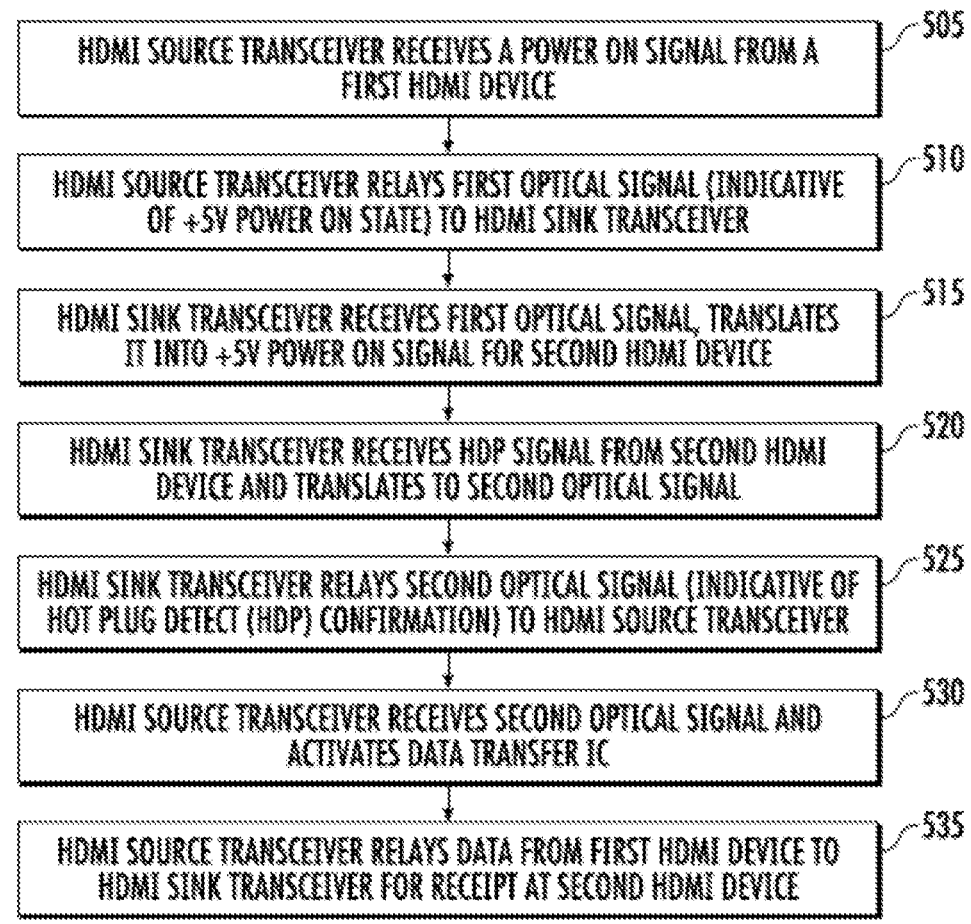
FIG. 8 depicts a flow chart of an example power-on method for a communication system according to example aspects of the present disclosure.

FIGS. 7-8 variously depict aspects of an example power-on system and method for an HDMI communication system according to example aspects of the present disclosure. The aspects described with reference to FIGS. 7-8 can be incorporated with any of the HDMI communication systems 100, 200, 300 depicted herein or with additional or alternative HDMI communication systems.

Referring more particularly to FIG. 7, HDMI communication system 400 is generally configured to serve as an optical communication interface between first and second HDMI devices (e.g., first HDMI device 102 and second HDMI device 104 of FIG. 1). HDMI communication system 400 can include a first HDMI coupling module 410, a second HDMI coupling module 420, and optical fiber cable(s) 430. The first HDMI coupling module 410 can include a first device connector 412 for coupling to a first HDMI device (e.g., first HDMI device 102 of FIG. 1), an HDMI source transceiver (e.g., first optical transceiver 114 of FIGS. 1-2) configured to relay data associated with the first HDMI device, and a source-side circuit 415 configured to receive a power-on signal from the first HDMI device and generate a first optical signal 413 for relay from the first HDMI coupling module 410 to the second HDMI coupling module 420. The second HDMI coupling module 420 can include a second device connector 422 for coupling to a second HDMI device (e.g., second HDMI device 104 of FIG. 1), an HDMI sink transceiver (e.g., second optical transceiver 124 of FIGS. 1-2) configured to relay data associated with the second HDMI device, and a sink-side circuit 425 configured to receive the first optical signal 413 from the source-side circuit 415 and to generate a second optical signal 423 for relay from the second HDMI coupling module 420 to the first HDMI coupling module 410. Optical fiber cable(s) 430 coupled between the first HDMI coupling module 410 and the second HDMI coupling module 420 can be configured to provide data transmission over a plurality of channels between the first HDMI coupling module 410 and the second HDMI coupling module 420 upon receipt of the second optical signal 423 by the first HDMI coupling module 410.

Referring still to FIG. 7, the first optical signal 413 can be indicative of a power-on signal 416 (e.g., a positive voltage signal (e.g., a +5V signal)) received from the first HDMI device (e.g., first HDMI device 102) as detected by one or more pins of the first device connector 412. The power-on signal 416 can be received by the source-side circuit 415 (e.g., a source protocol IC), which is configured to convert power-on signal 416 from an electrical signal to a first optical signal 413 for transmission over optical fiber cable(s) 430. In some implementations, the source-side circuit 415 of the first HDMI coupling module 410 is configured to wait for a first settling time to elapse between receiving the power-on signal 416 from the first HDMI device and relaying the first optical signal 413 from the first HDMI coupling module 410 to the second HDMI coupling module 420.

The sink-side circuit 425 (e.g., a sink protocol IC) is configured to receive the first optical signal 413 and convert it into an electrical signal for relay to second HDMI device connected to second device connector 422. This electrical signal from the sink-side circuit 425 could be in the form of a power-on signal for a second HDMI device (e.g., a +5V signal for USB). In some implementations, the second HDMI coupling module 420 can include a diode (e.g., one or more Schottky diodes 429) to prevent reverse power from the power-on signal for the second HDMI device from flowing back into the sink-side circuit 425. The sink-side circuit 425 in the second HDMI coupling module 420 can receive a hot plug detect (HDP) signal 426 from the second HDMI device, and translate the HDP signal 426 into the second optical signal 423. The second optical signal 423 is indicative of the hot plug detect (HPD) signal 426 received from the second HDMI device as detected by one or more pins of the second device connector 422. The source-side circuit 415 in the first HDMI coupling module 410 is configured to receive the second optical signal 423 and initiate activation (e.g., a wake-up signal) of a data transfer circuit for relaying data between the first HDMI coupling module 410 and second HDMI coupling module 420. In some implementations, the source-side circuit 415 of the first HDMI coupling module 410 is configured to wait for a second settling time to elapse between receiving the second optical signal 423 and relaying data between the HDMI source transceiver in the first HDMI coupling module 410 and the HDMI sink transceiver in the second HDMI coupling module 420.

FIG. 8 depicts a flow chart of an example power-on method 500 for an HDMI communication system (e.g., HDMI communication system 400) according to example aspects of the present disclosure. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for exemplary illustrated purposes and is not meant to be limiting. One or more portions of method 500 can be performed additionally, or alternatively, by other systems.

At 505, the method 500 can include receiving, by an HDMI source transceiver of a first HDMI coupling module (e.g., first HDMI coupling module 410 of FIG. 7), a power-on signal (e.g., power-on signal 416 of FIG. 7) from a first HDMI device coupled to the first HDMI coupling module. In some implementations, the power-on signal received at 505 can be applied to a source-side circuit (e.g., source-side circuit 415 of FIG. 7) in the first HDMI coupling module (e.g., first HDMI coupling module 410 of FIG. 7). The source-side circuit in the first HDMI coupling module can then be used to generate the first optical signal (e.g., first optical signal 413 of FIG. 7).

At 510, the method 500 can include relaying, by the HDMI source transceiver of first HDMI coupling module (e.g., first HDMI coupling module 410 of FIG. 7), a first optical signal (e.g., first optical signal 413 of FIG. 7) to a second HDMI coupling module (e.g., second HDMI coupling module 420 of FIG. 7) coupled to a second HDMI device. The first optical signal relayed at 510 can be indicative of the power-on signal received at 505 from the first HDMI device and detected by one or more pins of a connector between the first HDMI coupling module and the first HDMI device. In some implementations, the method 500 can include an optional step of waiting for a first settling time to elapse between receiving the power-on signal from the first HDMI device at 505 and relaying the first optical signal from the first HDMI coupling module to the second HDMI coupling module at 510.

At 515, the method 500 can include receiving the first optical signal (e.g., first optical signal 413 of FIG. 7) at a sink-side circuit (e.g., sink-side circuit 425 of FIG. 7) in the second HDMI coupling module (e.g., second HDMI coupling module 420 of FIG. 7) and using the sink-side circuit (e.g., sink-side circuit 425) to translate the first optical signal (e.g., first optical signal 413 of FIG. 7) into a power-on signal for the second HDMI device.

At 520, the method can include receiving, by a sink-side circuit (e.g., sink-side circuit 425 of FIG. 7), a hot plug detect (HDP) signal (e.g., HDP signal 426 of FIG. 7) from the second HDMI device, and using the sink-side circuit (e.g., sink-side circuit 425 of FIG. 7) to translate the HDP signal (e.g., HDP signal 426 of FIG. 7) into the second optical signal (e.g., second optical signal 423 of FIG. 7).

At 525, the method 500 can include relaying, by the second HDMI coupling module (e.g., second HDMI coupling module 420 of FIG. 7), in response to receipt of the first optical signal (e.g., first optical signal 413 of FIG. 7), a second optical signal (e.g., second optical signal 423 of FIG. 7) to the first HDMI coupling module (e.g., first HDMI coupling module 410 of FIG. 7). The second optical signal relayed at 525 can be indicative of the hot plug detect (HPD) signal received from the second HDMI device at 520.

At 530, the method 500 can include receiving, by an HDMI source transceiver in a first HDMI coupling module (e.g., first HDMI coupling module 410 of FIG. 7), the second optical signal (e.g., second optical signal 423 of FIG. 7) and initiating activation, by the first HDMI coupling module (e.g., first HDMI coupling module 410 of FIG. 7), in response to receipt of the second optical signal (e.g., second optical signal 423 of FIG. 7), a data transfer circuit for relaying data between the first HDMI coupling module (e.g., first HDMI coupling module 410 of FIG. 7) and the second HDMI coupling module (e.g., second HDMI coupling module 420 of FIG. 7).

At 535, the method 500 can include relaying, by first HDMI coupling module (e.g., first HDMI coupling module 410 of FIG. 7), data from the first HDMI device to the second HDMI coupling module (e.g., second HDMI coupling module 420 of FIG. 7) for receipt at the second HDMI device. In some implementations, method 500 can include an optional step of waiting for a second settling time to elapse between receiving the second optical signal at 530 and relaying data at 535 between an HDMI source transceiver in the first HDMI coupling module and an HDMI sink transceiver in the second HDMI coupling module.

Figure 9:
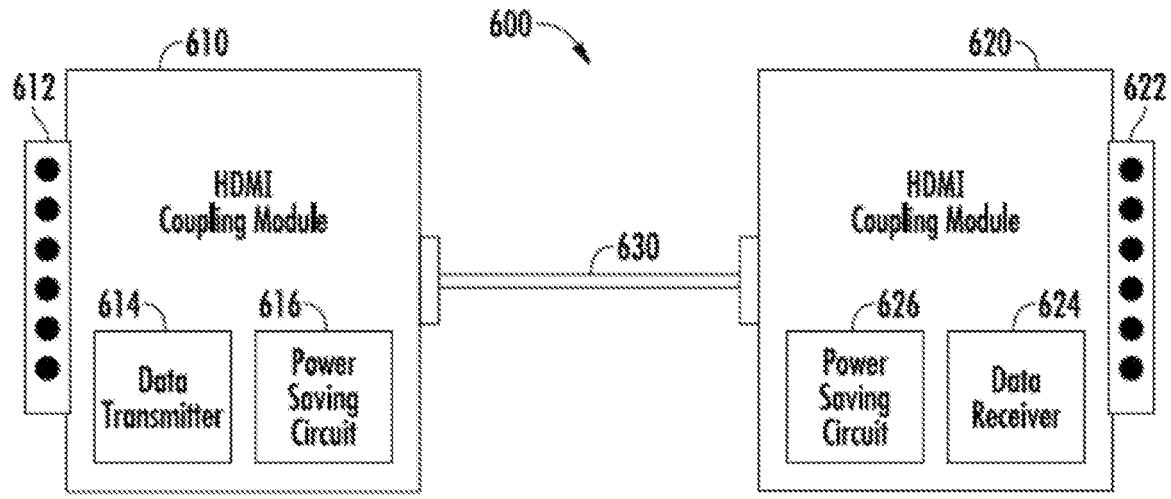
FIG. 9 depicts a block diagram of a example power saving communication system according to example aspects of the present disclosure.

FIG. 9 depicts a block diagram of an example power saving HDMI communication system 600 according to example aspects of the present disclosure. HDMI communication system 600 is generally configured to serve as an optical communication interface between first and second HDMI devices (e.g., first HDMI device 102 and second HDMI device 104 of FIG. 1). Power saving HDMI communication system 600 can include a first HDMI coupling module 610, a second HDMI coupling module 620, and a cable 630. The first HDMI coupling module 610 can include a first device connector 612 for coupling to a first HDMI device (e.g., first HDMI device 102 of FIG. 1) and a data transmitter 614 for transmitting data received from the first HDMI device. In some implementations, data transmitter 614 can be embodied by first optical transceiver (e.g., first optical transceiver 114 of FIGS. 1-2). The second HDMI coupling module 620 can include a second device connector 622 for coupling to a second HDMI device (e.g., second HDMI device 104 of FIG. 1) and a data receiver 624 for receiving data designated for receipt by the second HDMI device. In some implementations, data receiver 624 can be embodied by second optical transceiver (e.g., second optical transceiver 124 of FIGS. 1-2). The optical fiber cable 630 coupled between the first HDMI coupling module 610 and the second HDMI coupling module 620 can include some or all of the features and functionality of optical fiber cable(s) 130 and electrical wires 150 depicted in FIGS. 1-2, and can be configured to provide data transmission over a plurality of channels between the first HDMI coupling module 610 and the second HDMI coupling module 620.

Referring still to FIG. 9, one or more of channels of the plurality of channels provided by optical fiber cable 630 can be operated in a power saving mode when there is no data to transmit between the first HDMI coupling module 610 and the second HDMI coupling module 620. In one example embodiment, first HDMI coupling module 610 can include a power saving circuit 616 coupled to the data transmitter 614 that is configured to provide power saving functionality at the transmitter side of HDMI communication system 600. In one implementation, power saving circuit 616 can include a signal detector configured to receive a plurality of data signal lines from a first HDMI device. Power saving circuit 616 can be further configured to generate a control signal to operate one or more channels of the plurality of channels over optical fiber cable 630 in a power saving mode when one or more data signal lines of the plurality of data signal lines from the first HDMI device indicate that no data is available. In another implementation, the first HDMI coupling module 620 can be configured to monitor the presence of data on a plurality of data signal lines from a first HDMI device. When no data has been present on one or more data signal lines of the plurality of data signal lines for a threshold amount of time, one or more channels provided over optical fiber cable 630 associated with the one or more data signal lines can be configured to operate in a power saving mode controlled by the power saving circuit 616.

In some implementations, the power saving circuit 616 can be coupled to a micro-controller implemented in a HDMI coupling module (e.g., HDMI coupling module 610). When no data has been present on one or more data signal lines of the plurality of data signal lines for a threshold amount of time, the power saving circuit 616 can send a control signal to the micro-controller to enter into a power saving mode. When data is present on one or more data signal lines of the plurality of data signal lines for a threshold amount of time, the power saving circuit 616 can send a control signal to the micro-controller to exit the power saving mode.

In some implementations, a HDMI coupling module may be configured to operate in a mode that sends data through a subset of data channels. For example, under fixed rate link (FRL) mode, a HDMI coupling module may send data through three channels if the FRL link rate is under a threshold (e.g., 6 Gbps). The HDMI coupling module may send data through four channels if the FRL link rate is under a threshold. The power saving circuit 616 may be configured to control one of the four channels to enter a power saving mode is the FRL link rate is under the threshold.

In one example embodiment, second HDMI coupling module 620 can include a power saving circuit 626 coupled to the data receiver 624 that is configured to provide power saving functionality at the receiver side of HDMI communication system 600. In one implementation, power saving circuit 626 of second HDMI coupling module 620 can be configured to monitor a given channel of the plurality of channels provided over optical fiber cable 630 between the first HDMI coupling module 610 and the second HDMI coupling module 620, the given channel designated in an operational mode for traffic detection. Operation of the remaining channels of the plurality of channels provided over optical fiber cable 630 between the first HDMI coupling module 610 and second HDMI coupling module 620 can be initiated in a power saving mode when no data traffic is detected on the given channel. When data traffic is detected on the given channel, all data channels provided over optical fiber cable 630 are activated in an operational mode for data transfer.

Figure 10:
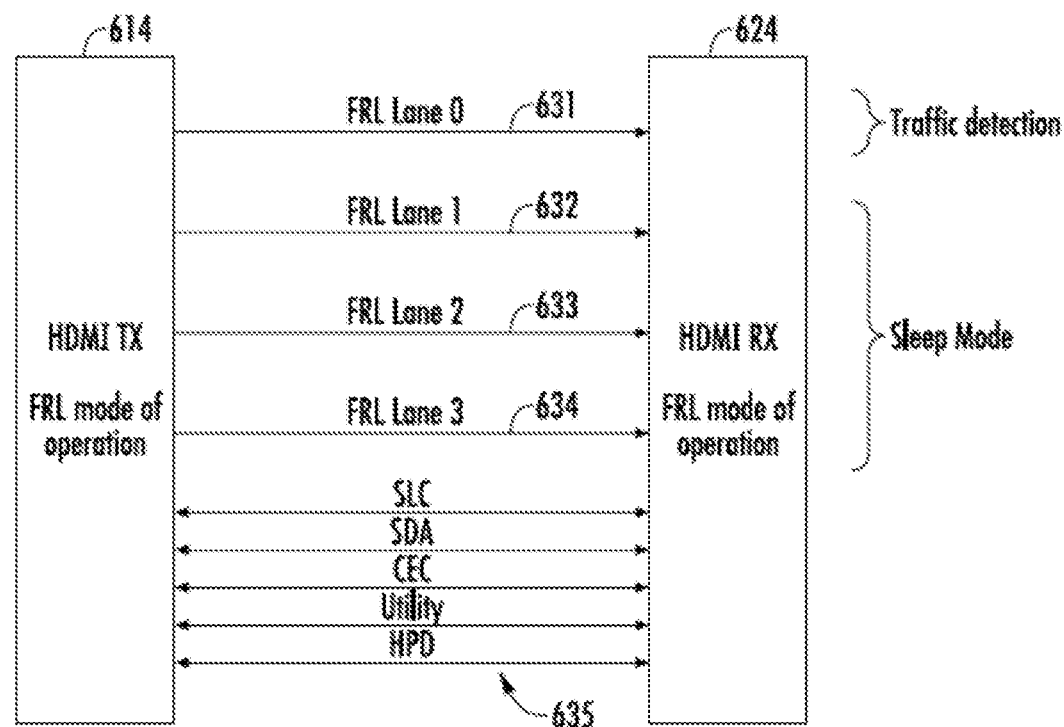
FIG. 10 depicts a block diagram of a example power saving communication system according to example aspects of the present disclosure.

FIG. 10 depicts a block diagram of additional aspects of the example power saving HDMI communication system 600 of FIG. 9 according to example aspects of the present disclosure. More particularly, FIG. 10 depicts different channels provided over the optical fiber cable 630 of FIG. 9 between data transmitter 614 of first HDMI coupling module 610 and data receiver 624 of second HDMI coupling module 620. In one example, optical fiber cable 630 can provide a plurality of data channels 631-634 and a plurality of utility channels 635. A given channel (e.g., data channel 631) of the plurality of data channels 631-634 can be designated for use in an operational mode for traffic detection. When no data traffic is detected on the given channel 631, operation of the remaining channels 632-634 of the plurality of channels 631-634 can be initiated in a power saving mode when no data traffic is detected on the given channel. The given channel 631 can remain active to monitor traffic detection. When data traffic is detected on the given channel 631, all data channels 631-634 provided over optical fiber cable 630 can be activated in an operational mode for data transfer.

Figure 11:
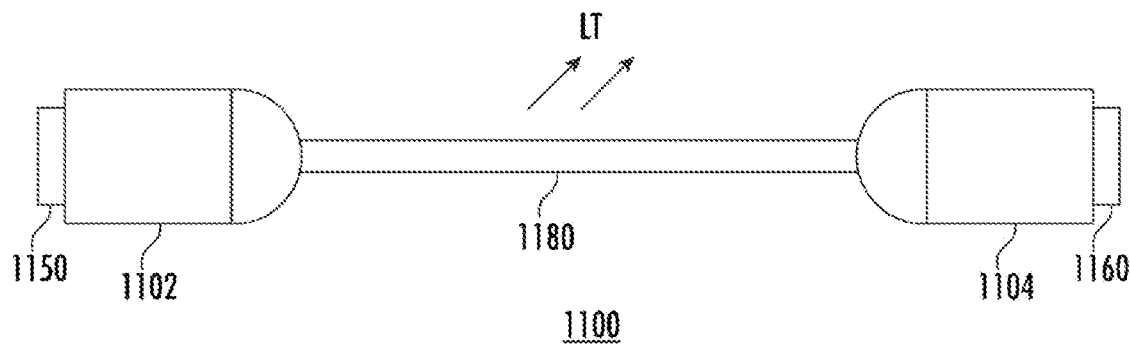
FIG. 11 depicts an example structure for an optical communication interface according to example aspects of the present disclosure.

FIG. 11 illustrates an implementation of an optical communication interface 1100. The optical communication interface 1100 can include means for communicating and receiving signals. For example, the optical communication interface 1100 can include transceivers 1102 and 1104 (e.g., the first HDMI coupling module 110 and the second HDMI coupling module 120 in reference to FIG. 1). The optical communication interface can further include means for connecting to various equipment. For example, the optical communication interface 1100 can include connectors 1150 and 1160 (e.g., disposed on opposite ends). The optical communication interface 1100 can further include means for signal propagation. For example, the optical communication interface 1100 can include a cable 1180. As further described herein, the cable can include one or more optical fibers including, for example, a first optical fiber (e.g., optical fiber(s) 130 in reference to FIG. 1). In some implementations, the cable can also include one or more electrical cables (e.g., electrical cable(s) 150 in reference to FIG. 1). According to additional example aspects of the present disclosure, the optical communication interface 1100 (e.g., the cable 1180) can further include a light-emitting element 1190 (depicted in FIG. 12). For example, the light emitting element 1190 can partially or fully surround the cable 1180 (e.g., the first optical fiber). In some implementations, the cable 1180 can be a coiled cable or an uncoiled cable.

In various implementations, the optical communication interface 1100 can be a HDMI, USB, DP, DVI, VGA, or other type of optical communication interface. In some implementations, the connectors 1150 and 1160 can be coupled to various devices, such as source devices (e.g., Blu-Ray Disc Player, laptop, personal computer, game console, etc.) and/or sink devices (e.g., TV, display monitor, etc.)

A light (denoted LT) emitted by the light-emitting element 1190 can correspond to a data information. For example, the light LT emitted by the light-emitting element 1190 can be varied according to data information communicated over the cable 1180. The data information can be, for example, one or more characteristics associated with the first transceiver or the second transceiver.

For example, in some implementations, the data information (e.g., the one or more characteristics associated with the first transceiver or the second transceiver) can be a data transmitting rate, a clock rate, an image resolution, a power consumption, a temperature, a vibration level, a content of the transmitting data/associated with input data or a first optical signal, or other types of data information processed by the transceivers 1102 and 1104.

For example, in some implementations, a frequency of the light LT (e.g., pulses of light over a time period) can be varied according to the data information. For example, a first resolution data information (e.g., lower resolution) can have a first frequency (e.g., 2 pulses per second) while a second resolution data information (e.g., higher resolution) can have a second frequency (e.g., 4 pulses per second). Other frequencies can similarly be used to communicate various data information to a user.

In some implementations, a color of the light LT emitted by the light-emitting element 1190 can be varied according to the data information. For example, a temperature data information (e.g., temperature of one or more components of the optical communication interface 1100, an ambient temperature, etc.) can be associated with a first color (e.g., blue)

at a first temperature reading (e.g., 50F), and a second temperature data information can be associated with a second color (e.g., red) at a second temperature data reading (e.g., 90F). Other colors can similarly be used to communicate various data information to a user. Such lighting information may be used to identify whether a system or an optical communication interface is operating under normal condition or may be overheated.

In some implementations, a brightness (e.g., luminous intensity) of the light LT emitted by the light-emitting element 1190 can be varied. For example, a power consumption data information (e.g., charging rate or charging power) can be associated with a first brightness (e.g., 10 lumens) at a first power consumption level (e.g., a low power consumption level) and a second power consumption data information (e.g., a high power consumption level) can be associated with a second brightness (e.g., 20 lumens) at a second power consumption level. Other brightness levels can similarly be used to communicate various data information to a user.

In some implementations, an optical communication interface (e.g., a light-control circuit) can be configured to control the light-emitting element 1190 based at least in part on a comparison of the data information (e.g., the one or more characteristics) to a threshold. For example, a number of lights LT emitted by the light-emitting element 1190 can be varied according to the data information (e.g., the one or more characteristics). For example, a first media type (e.g., audio file) can be associated with a first number of lights (e.g., a single light) whereas a second media type (e.g., audio-visual file) can be associated with a second number of lights (e.g., two lights). For example, the light-emitting element 1190 can include a plurality of light sources (e.g., LEDs, optical fibers, etc.) which can be selectively activated to increase or decrease the number of lights LT emitted by the light-emitting element 1190. Other numbers of light LT can similarly be used to communicate various data information to a user.

In some implementations, the light LT emitted by the light-emitting element 1190 can be a first type of light (e.g., blinking, sparkling, fading, wavering, etc.) when a data information is at a first level (e.g., below a threshold) and the light LT emitted by the light-emitting element 1190 can be a second type of light (e.g., constant) when the data information is above the threshold. For example, a power consumption, clock rate, resolution, vibration level, etc. can have various thresholds and corresponding lights. Similarly, various types of data information (e.g., relevant to gaming information, audio media, AV media, etc.) can have associated types of lights LT.

Figure 12:
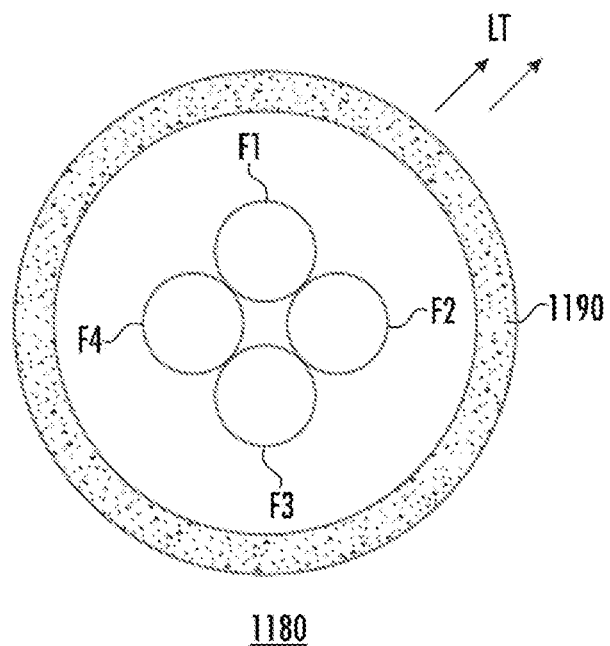
FIG. 12 depicts a cross-sectional view of an example optical communication interface according to example aspects of the present disclosure.

Referring now to FIG. 12, a cross-sectional view of an example cable 1180 according to example aspects of the present disclosure is depicted. The cable 1180 can be, for example, a cable 1180 as depicted in FIG. 11. As shown, the cable 180 includes a light-emitting element 1190 and a plurality of optical fibers F1, F2, F3, and F4. In various implementations, the cable 1180 can include any number of fibers (e.g., a single fiber, two fibers, etc.). In some implementations, the cable 1180 may include one or more electrical wires (e.g., copper wires) in addition to optical fibers. For example, electrical wires can be used to transmit information that requires a lower data rate such as metadata associated with the source and/or sink devices. Further, as shown, the light-emitting element 1190 can partially or fully surround the cable 180, thereby covering the optical fibers F1-F4.

Each of the optical fibers F1-F4 can be configured to transmit one or more optical signals. For example, in some implementations, the optical signals can be generated by transceivers (e.g., 1102, 1104, etc.)

According to example aspects of the present disclosure, the light-emitting element 1190 can be configured to emit light LT corresponding to a data information. For example, the data information can be transmitted via the one or more optical fibers F1-F4. For example, in some implementations, the data information (e.g., one or more characteristics associated with a first transceiver or a second transceiver) can include a data transmitting rate, a clock rate, an image resolution, a power consumption, a temperature, a vibration level, and/or a content associated with an input data. In some implementations, the data information (e.g., one or more characteristics) can include a vibration level communicated from a vibration sensor, as described herein.

The light-emitting element 1190 can include various types of lights. For example, in some implementations, the light emitting element 1190 can include one or more light-emitting strands wound around the optical fibers F1-F4. In some implementations, the light-emitting element 1190 can include portions which emit light (e.g., translucent portions) and portions which do not emit light (e.g., blacked-out portions). In some implementations, the light emitting element can include LEDs, laser diodes, lamps, and/or other light-emitting elements.

In some implementations, the light LT emitted from the light-emitting element 190 can include various types of light (e.g., colors, frequencies, brightness, number of lights, etc.). For example, the types of lights and/or the attributes of the light emitted by the light-emitting element 1190 can be controlled according to the data information transmitted over the optical fibers F1-F4.

Figure 13:
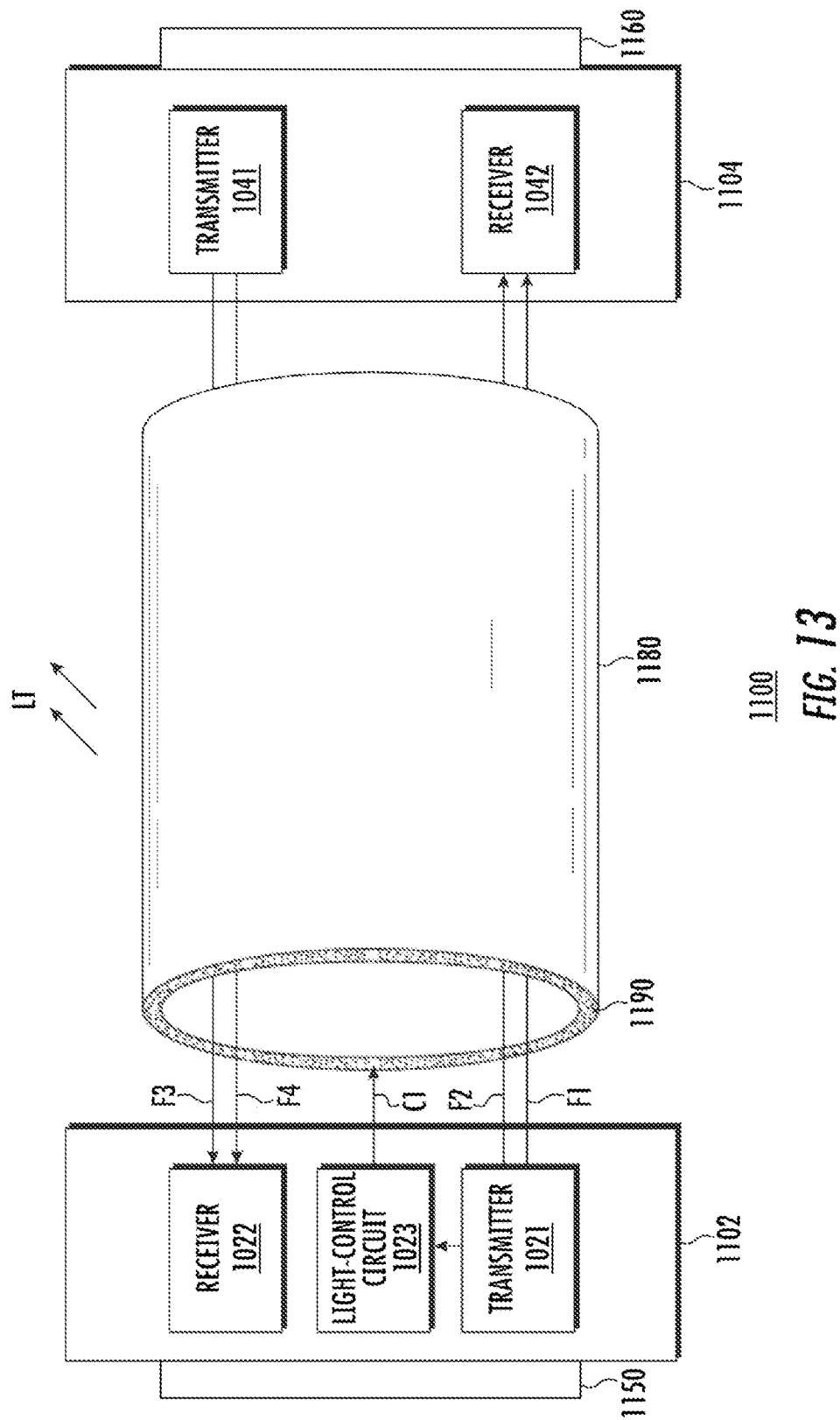
FIGS. 13-22 depict examples of an optical communication interface according to example aspects of the present disclosure.

For example, referring now to FIG. 13, an example optical communication interface 1100 according to example aspects of the present disclosure is depicted. The optical communication interface 1100 can include means for converting, transmitting, and receiving signals. For example, as shown, transceivers 1102 and 1104 are positioned at opposite ends of cable 1180. The optical communication interface can further include means for connecting to various devices. For example, connectors 1150/1160 can be configured to connect the optical communication interface 1100 to various sources and sinks as described herein. The optical communication interface can further include means for emitting light LT. For example, light-emitting element 1190 can be configured to emit light LT according to a data information (e.g., based at least in part upon the data information). As shown, first transceiver 1102 can include a transmitter 1021, a receiver 1022, and a light-control circuit 1023. Similarly, transceiver 1104 can include a transmitter 1041 and a receiver 1042.

The transmitter 1021 can be configured to transmit an input data provided via the connector 1150 to the receiver 1042. For example, in some implementations, the data input into the connector 1150 can include electrical signals which can be converted into optical signals and transmitted via one or more optical fibers (e.g., F1, F2).

The receiver 1042 can be configured to receive the optical signals transmitted on one or more optical fibers (e.g., F1, F2), and convert the received optical signals into electrical signals. The converted electrical signals can then be output to the connector 1160, such as to be provided to a sink device.

The transmitter 1041 can be configured to transmit data input into the connector 1160 to the receiver 1022. For example, data input to the connector 1160 can be electrical signals and can be converted into optical signals and transmitted via one or more optical fibers (e.g., F3, F4).

The receiver 1022 can be configured to receive the optical signals transmitted on one or more optical fibers (e.g., F3, F4), and convert the received optical signals into electrical signals. The converted electrical signals can be output to the connector 1150, such as to a source device.

The optical communication interface 1100 can further include means for controlling a light LT emitted by the light-emitting element 1190. For example, as shown in the example optical communication interface 1100 depicted in FIG. 13, the transceiver 1102 can further include a light-control circuit 1023. The light-control circuit 1023 can be configured to generate a light-control signal C1 to control the light LT according to a data information processed by the transmitter 1021. For example, the input data provided to the connector 1150 can be converted from an electrical signal to an optical signal by the transmitter 1021, and the data information corresponding to the input data can be provided to the light-control circuit 1023. The light-control circuit 1023 can control the light LT emitted by the light-emitting element 1190 according to the data information.

For example, the data information can be a data transmitting rate (e.g., a rate of the data transmitted from the transmitter 1021 over fibers F1, F2), a clock rate (e.g., a frequency of a clock cycle), an image resolution (e.g. a number of pixels of a communicated image), a power consumption (e.g., a power consumption of a sink device, a source device, etc.), a temperature (e.g., an operating temperature), a vibration level (e.g., from a vibration sensor as describe herein), and/or a content of the transmitting data (e.g., a type of data transmitted, such as audio, gaming, A/V media, etc.).

In some implementations, the light-control circuit 1023 can be configured to control the lighting modes of the light-emitting element 1190, such as the lighting color, frequency, brightness, type of light, a number of lights, and/or other attributes of the light LT as described herein. For example, the light LT emitted by the light-emitting element 1190 can be controlled by the light-control circuit 1023 according to the data information of one or more signals communicated over the fibers (e.g., F1-F4).

The light-control circuit 1023 can be implemented by any suitable means, such as an application specific integrated circuit (ASIC), digital signal processing (DSP) processor, general-purpose processor, processor core, microprocessor, controller, microcontroller, and can be one processor or a plurality of processors that are operatively connected. In some implementations, the light-control circuit 1023 can include one or more non-transitory computer-readable storage media, such as RAM, ROM, EEPROM, EPROM, one or more memory devices, flash memory devices, etc., and combinations thereof.

In this way, the light LT emitted by the light-emitting element 1190 can be controlled to provide visual information to a user. For example, the light LT emitted by the light-emitting element 1190 can be controlled by the light-control circuit 1023 to provide a visual indication of one or more attributes of the data information being communicated over the cable 1180. This can allow for a user to readily ascertain an operating status of the source device, sink device, and/or the optical communication interface 1100.

Figure 14:
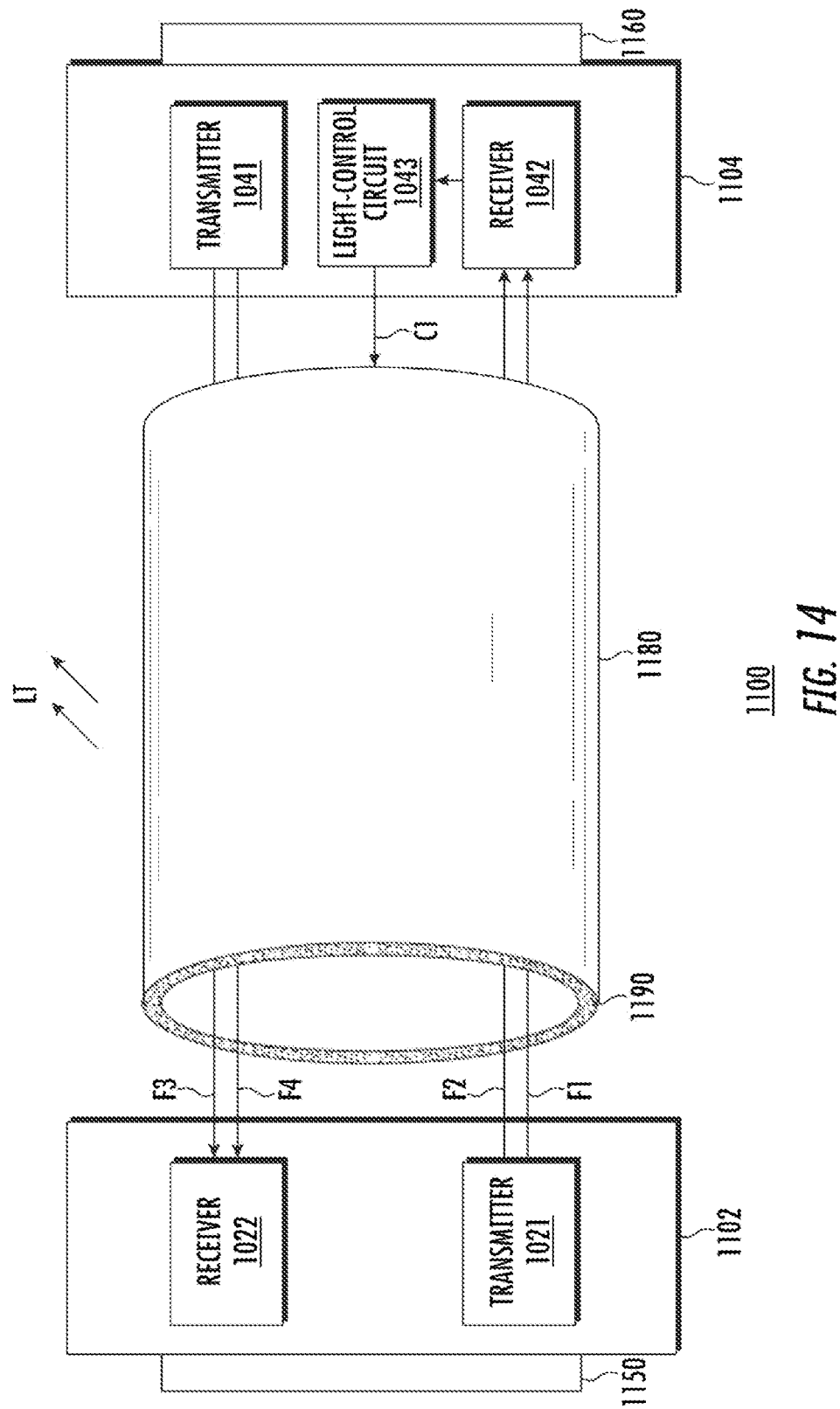

Referring now to FIG. 14, an example optical communication interface 1100 according to example aspects of the present disclosure is depicted. Similar to the optical communication interface 1100 depicted in FIG. 13, the transceivers 1102 and 1104 are positioned at opposite ends of cable 1180. Connectors 1150/1160 can be configured to connect the optical communication interface 1100 to various sources and sinks as described herein. Light-emitting element 1190 can be configured to emit light LT according to a data information. As shown, transceiver 1102 can include a transmitter 1021 and a receiver 1022. Similarly, transceiver 1104 can include a transmitter 1041 and a receiver 1042. However, as shown in FIG. 14, a light-control circuit 1043 is included in transceiver 1104. The light-control circuit 11043 can operate essentially the same as the light-control circuit 1023 depicted in FIG. 13.

For example, transmitter 1021 can be configured to transmit an input data provided via the connector 1150 to the receiver 1042. For example, the data input into the connector 1150 can include electrical signals which can be converted into optical signals and transmitted via one or more optical fibers (e.g., F1, F2).

The receiver 1042 can be configured to receive the optical signals transmitted on one or more optical fibers (e.g., F1, F2) and convert the received optical signals into electrical signals. The converted electrical signals can then be output to the connector 1160.

The transmitter 1041 can be configured to transmit data input into the connector 1160 to the receiver 1022. For example, data input to the connector 1160 can be electrical signals and can be converted into optical signals and transmitted via one or more optical fibers (e.g., F3, F4).

The receiver 1022 can be configured to receive the optical signals transmitted on one or more optical fibers (e.g., F3, F4), and convert the received optical signals into electrical signals. The converted electrical signals can be output to the connector 1150.

The light-control circuit 1043 can be configured to generate a light-control signal C1 to control the light LT according to a data information processed by the receiver 1042. For example, the optical signals received by receiver 1042 over fibers F1 and F2 can be converted by the receiver 1042 into electrical signals and the data information associated with the electrical signals can be provided to the light-control circuit 1043.

For example, the data information can be a data transmitting rate (e.g., a rate of the data received by the receiver 1042 over fibers F1, F2), a clock rate (e.g., a frequency of a clock cycle), an image resolution (e.g. a number of pixels of a communicated image), a power consumption (e.g., a power consumption of a sink device, a source device, etc.), a temperature (e.g., an operating temperature), a vibration level (e.g., from a vibration sensor as describe herein), and/or a content of the transmitting data (e.g., a type of data transmitted).

In some implementations, the light-control circuit 1043 can be configured to control the lighting modes of the light-emitting element 1190, such as the lighting color, frequency, brightness, type of light, a number of lights, and/or other attributes of the light LT as described herein. For example, the light LT emitted by the light-emitting element 1190 can be controlled by the light-control circuit 1043 according to the data information of one or more signals communicated over the fibers (e.g., F1-F4).

The light-control circuit 1043 can be implemented by any suitable means, such as an application specific integrated circuit (ASIC), digital signal processing (DSP) processor, general-purpose processor, processor core, microprocessor, controller, microcontroller, and can be one processor or a plurality of processors that are operatively connected. In some implementations, the light-control circuit 1023 can include one or more non-transitory computer-readable storage media, such as RAM, ROM, EEPROM, EPROM, one or more memory devices, flash memory devices, etc., and combinations thereof.

In this way, the light LT emitted by the light-emitting element 1190 can be controlled to provide visual information to a user. For example, the light LT emitted by the light-emitting element 1190 can be controlled by the light-control circuit 1043 to provide a visual indication of one or more attributes of the data information being communicated over the cable 1180. This can allow for a user to readily ascertain an operating status of the source device, sink device, and/or the optical communication interface 1100.

Figure 15:
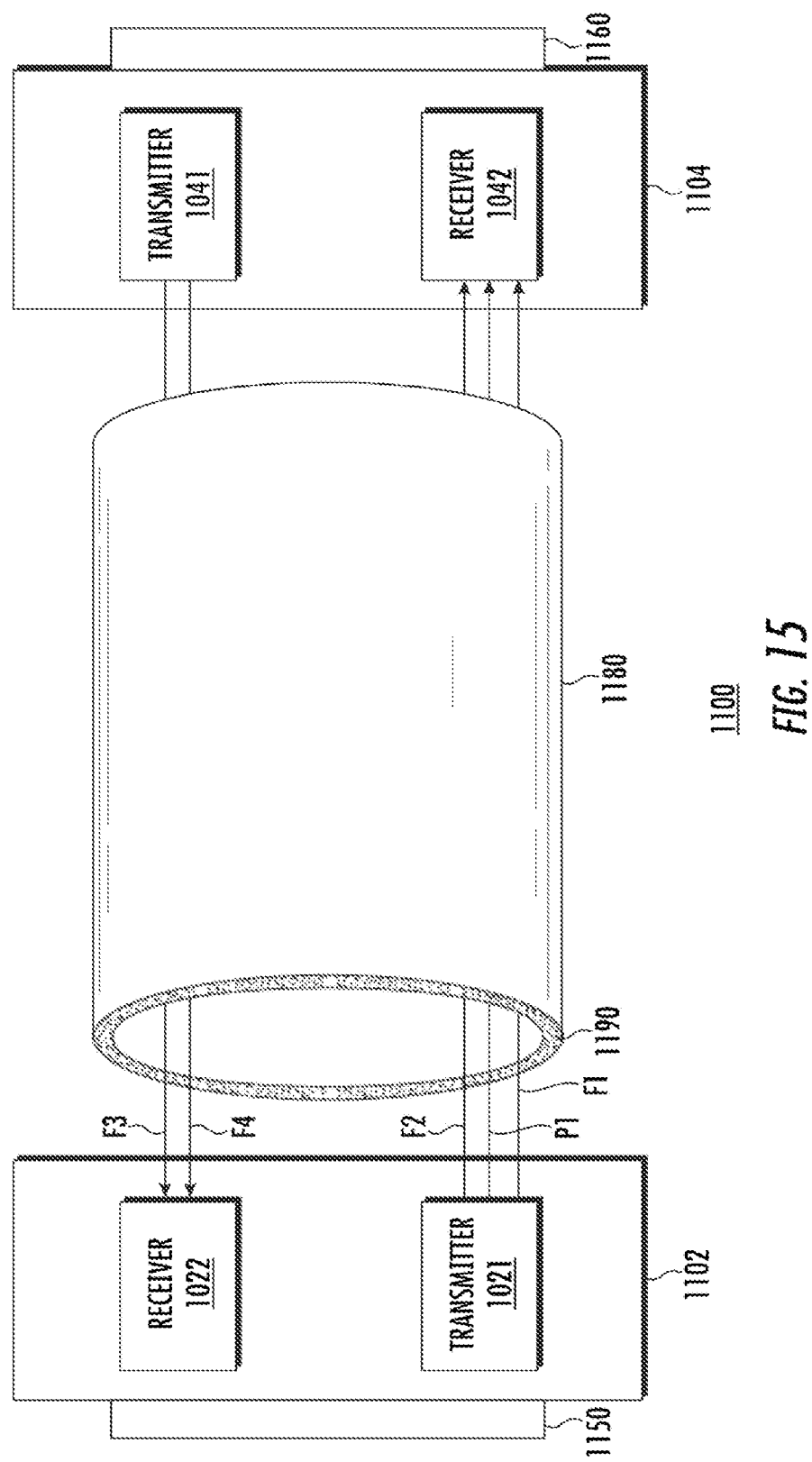

Referring now to FIG. 15, an optical communication interface 1100 according to example aspects of the present disclosure is depicted. As shown, the optical communication interface 1100 can include transceivers 1102 and 1104 situated on opposite ends of cable 1180. Connectors 1150/1160 can be configured to connect the optical communication interface 1100 to various sources and sinks as described herein. As shown, transceiver 1102 can include a transmitter 1021, and a receiver 1022. Similarly, transceiver 1104 can include a transmitter 1041 and a receiver 1042. The receiver 1042 can be configured to receive the optical signals transmitted on one or more optical fibers (e.g., F1, F2), and convert the received optical signals into electrical signals. The converted electrical signals can then be output to the connector 1160. The transmitter 1041 can be configured to transmit data input into the connector 1160 to the receiver 1022. For example, data input to the connector 1160 can be electrical signals and can be converted into optical signals and transmitted via one or more optical fibers (e.g., F3, F4).

According to additional aspects of the present disclosure, the optical communication interface 1100 can further include a fiber P1 configured to provide power to the receiver 1042 by the transmitter 1021. For example, fiber P1 can be an optical fiber, and optical signals transmitted by the transmitter 1021 through the fiber P1 can be converted to an electrical signal which can be used to power the receiver 1042. The receiver 1042 can include means for converting the optical signal to an electrical signal. For example, in some implementations, the receiver 1042 can include a suitable optical to electrical converting semiconductor, such as a PV cell, etc. An advantage provided by such a configuration is the ability to eliminate the need for an additional power pin connected to a power source through a sink device (e.g., a TV or monitor).

In some implementations, the optical signal transmitted on the fiber P1 can be a high power signal. The power of the optical signal transmitted on the fiber P1 can be higher than the power of the optical signals transmitted on the fibers F1-F4. In some implementations, when the power level is less than a threshold (e.g., 5% of total power) or a condition indicates that one or more of fibers F1-F4 or cable 1180 may be damaged, the optical signal transmitted on fiber P1 can be stopped (e.g., controlled by the transmitter 1021). This can improve the safety of the optical communication interface 1100.

Figure 16:
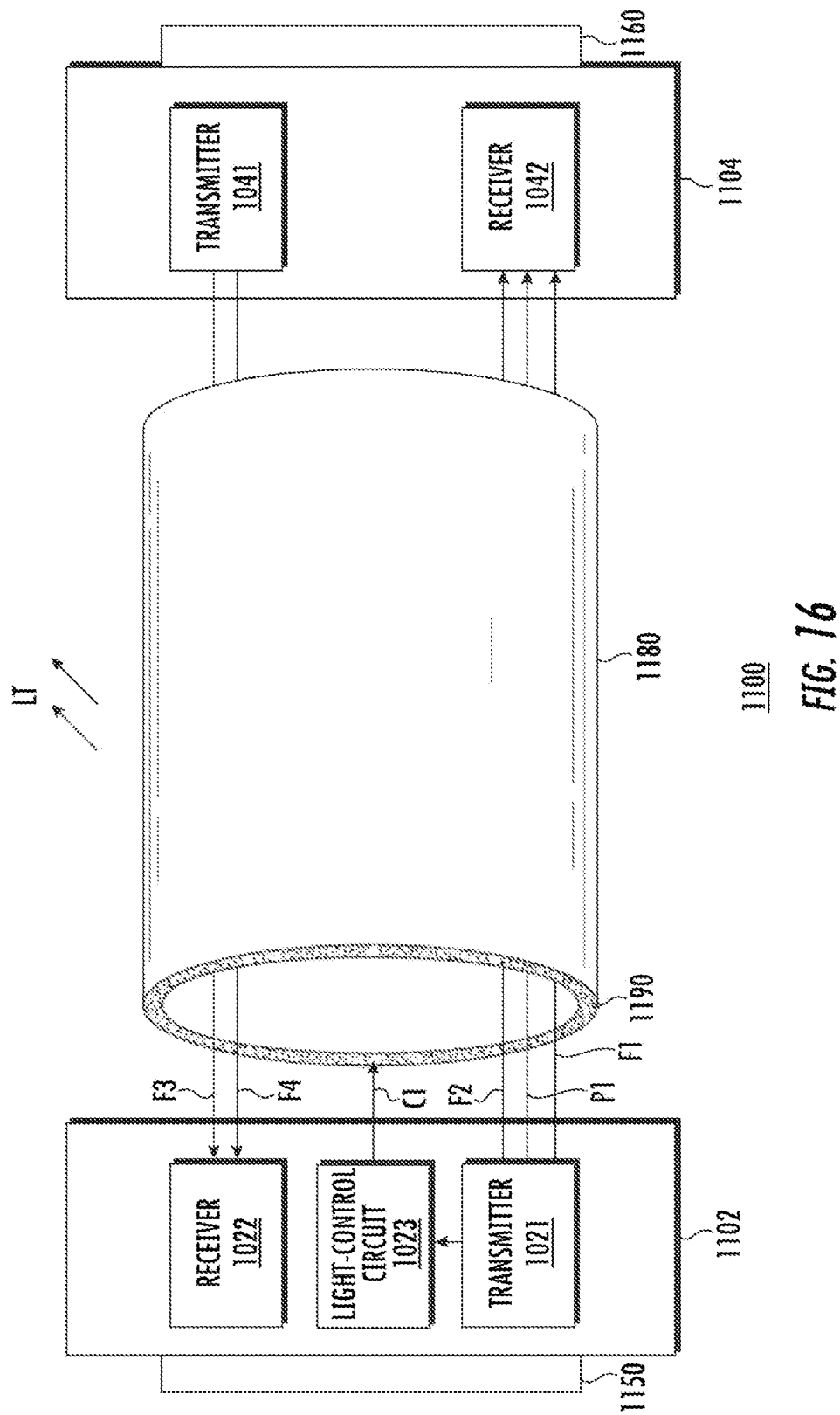

Referring now to FIG. 16, an optical communication interface 1100 according to example aspects of the present disclosure is depicted. Similar to FIG. 15, the optical communication interface 1100 can include transceivers 1102 and 1104 situated on opposite ends of cable 1180. Connectors 1150/1160 can be configured to connect the optical communication interface 1100 to various sources and sinks as described herein. As shown, transceiver 1102 can include a transmitter 1021, and a receiver 1022. Similarly, transceiver 1104 can include a transmitter 1041 and a receiver 1042. The receiver 1042 can be configured to receive the optical signals transmitted on one or more optical fibers (e.g., F1, F2), and convert the received optical signals into electrical signals. The converted electrical signals can then be output to the connector 1160. The transmitter 1041 can be configured to transmit data input into the connector 1160 to the receiver 1022. For example, data input to the connector 1160 can be electrical signals and can be converted into optical signals and transmitted via one or more optical fibers (e.g., F3, F4). The optical communication interface 1100 can further include a fiber P1 configured to provide power to the receiver 1042 by the transmitter 1021.

Further, as shown, the optical communication interface 1100 can include a light-control circuit 1023 in the transceiver 1102, similar to the light-control circuit 1023 depicted in FIG. 13. For example, the light-control circuit 1023 can control a light LT emitted from a light-emitting element 1190, as disclosed herein.

Figure 17:
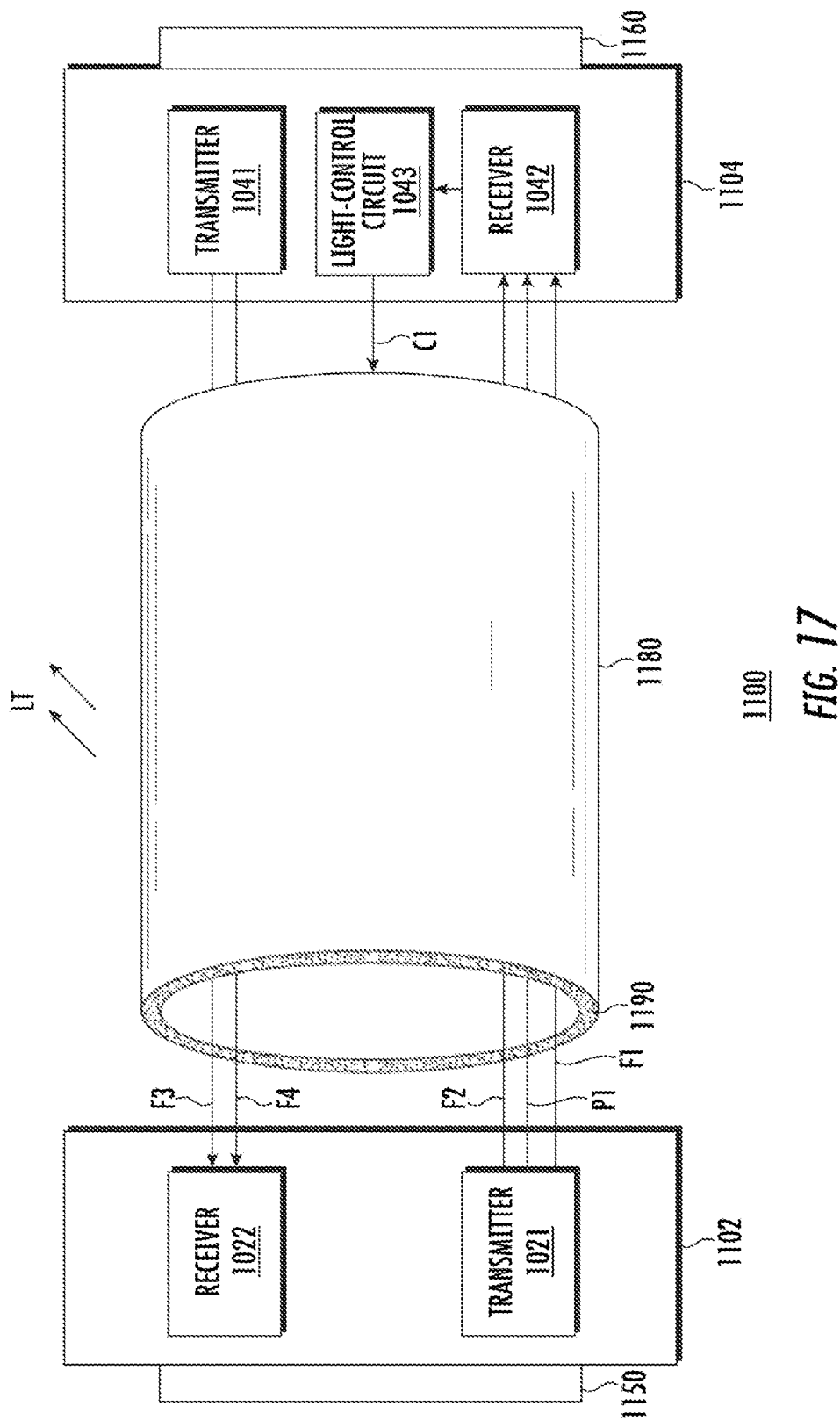

Referring now to FIG. 17, an optical communication interface 1100 according to example aspects of the present disclosure is depicted. Similar to FIG. 15, the optical communication interface 1100 can include transceivers 1102 and 1104 situated on opposite ends of cable 1180. Connectors 1150/1160 can be configured to connect the optical communication interface 1100 to various sources and sinks as described herein. As shown, transceiver 1102 can include a transmitter 1021, and a receiver 1022. Similarly, transceiver 1104 can include a transmitter 1041 and a receiver 1042. The receiver 1042 can be configured to receive the optical signals transmitted on one or more optical fibers (e.g., F1, F2), and convert the received optical signals into electrical signals. The converted electrical signals can then be output to the connector 1160. The transmitter 1041 can be configured to transmit data input into the connector 1160 to the receiver 1022. For example, data input to the connector 1160 can be electrical signals and can be converted into optical signals and transmitted via one or more optical fibers (e.g., F3, F4). The optical communication interface 1100 can further include a fiber P1 configured to provide power to the receiver 1042 by the transmitter 1021.

Further, as shown, the optical communication interface 1100 can include a light-control circuit 1043 in the transceiver 1104, similar to the light-control circuit 1043 depicted in FIG. 14. For example, the light-control circuit 1043 can control a light LT emitted from a light-emitting element 1190, as disclosed herein.

Figure 18:
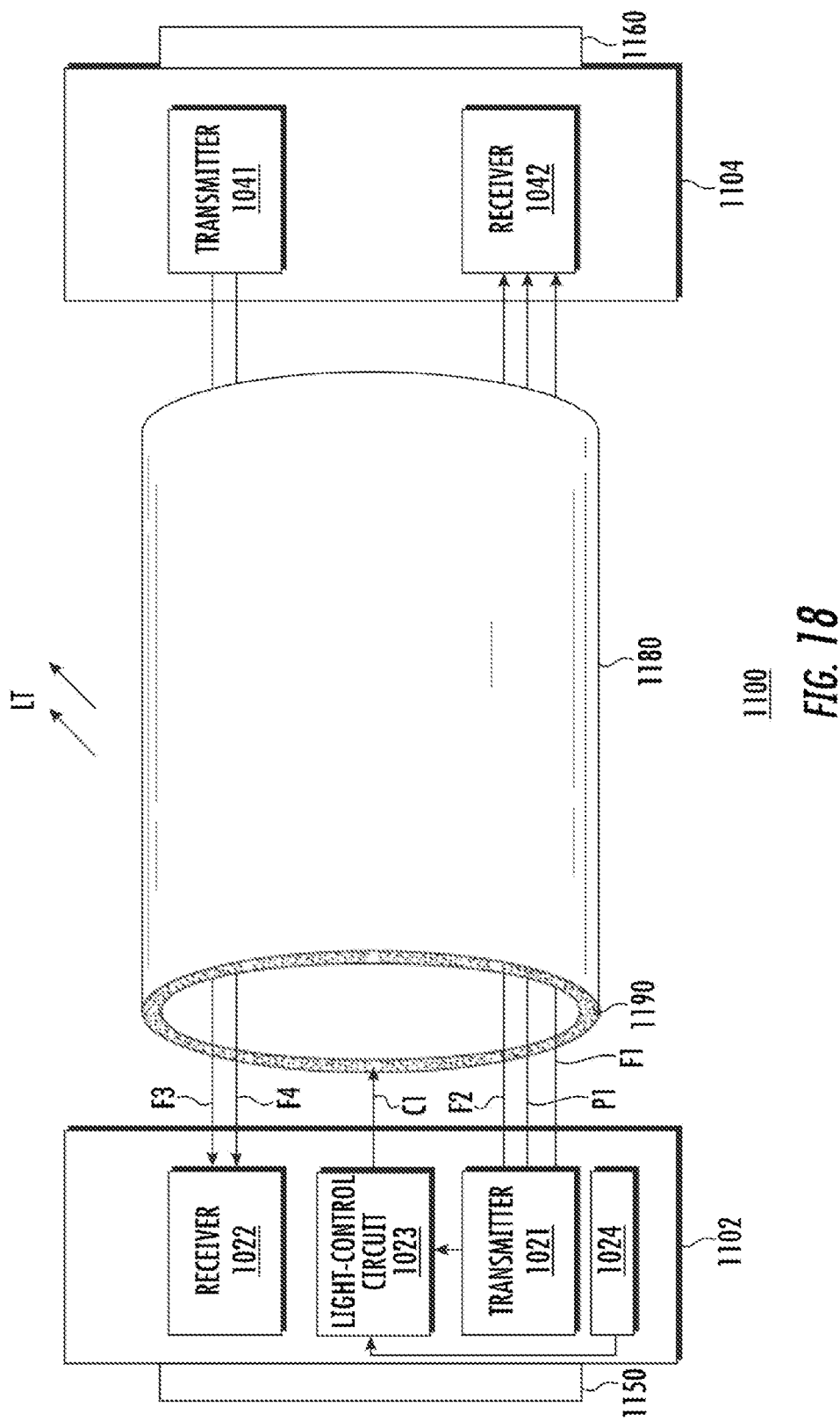

Referring now to FIG. 18, an optical communication interface 1100 according to example aspects of the present disclosure is depicted. Similar to FIG. 16, the optical communication interface 1100 can include transceivers 1102 and 1104 situated on opposite ends of cable 1180. Connectors 1150/1160 can be configured to connect the optical communication interface 1100 to various sources and sinks as described herein. As shown, transceiver 1102 can include a transmitter 1021, and a receiver 1022. Similarly, transceiver 1104 can include a transmitter 1041 and a receiver 1042. The receiver 1042 can be configured to receive the optical signals transmitted on one or more optical fibers (e.g., F1, F2), and convert the received optical signals into electrical signals. The converted electrical signals can then be output to the connector 1160. The transmitter 1041 can be configured to transmit data input into the connector 1160 to the receiver 1022. For example, data input to the connector 1160 can be electrical signals and can be converted into optical signals and transmitted via one or more optical fibers (e.g., F3, F4). The optical communication interface 1100 can further include a fiber P1 configured to provide power to the receiver 1042 by the transmitter 1021.

Additionally, the optical communication interface 1100 can include a light-control circuit 1023 in the transceiver 1102, similar to the light-control circuit 1023 depicted in FIGS. 13 and 16. For example, the light-control circuit 1023 can control a light LT emitted from a light-emitting element 1190, as disclosed herein.

According to additional example aspects of the present disclosure, in some implementations the optical communication interface 1100 can include a means for determining a vibration level. For example, the optical communication interface 1100 can include a vibration sensor 1024. In some implementations, the vibration sensor 1024 can be included in or otherwise be a part of a transceiver 1102. In some implementations, the vibration sensor 1024 can be a G-sensor or a GYRO-sensor. In some implementations, the vibration sensor 1024 can be configured to use Micro-Electro-Mechanical-Systems (MEMS) technology and packaging. In some implementations, the vibration sensor 1024 can be configured to transmit a data information about a vibration level to the light-control circuit 1023. For example, the vibration level can correspond to a vibration detected by the vibration sensor 1024 and/or a vibration associated with a connected device (e.g., a source device connected to connector 1150). The light-control circuit 1023 can be configured to control a light LT according to the data information (e.g., the vibration level). As examples, the light LT emitted by the light-emitting element 1190 can pulse at a vibration frequency or have a brightness associated with a vibration level (e.g., various vibration level thresholds can correspond to brightness levels).

In some implementations, the vibration sensor 1024 can be positioned or otherwise included in a transceiver 1104. For example, the transceiver 1104 can include a vibration sensor 1024 and a light-control circuit 1043 as depicted in FIGS. 14 and 17. Further, the vibration level can correspond to a vibration detected by the vibration sensor 1024 and/or a vibration associated with a connected device (e.g., a sink device connected to connector 1160).

Figure 19:
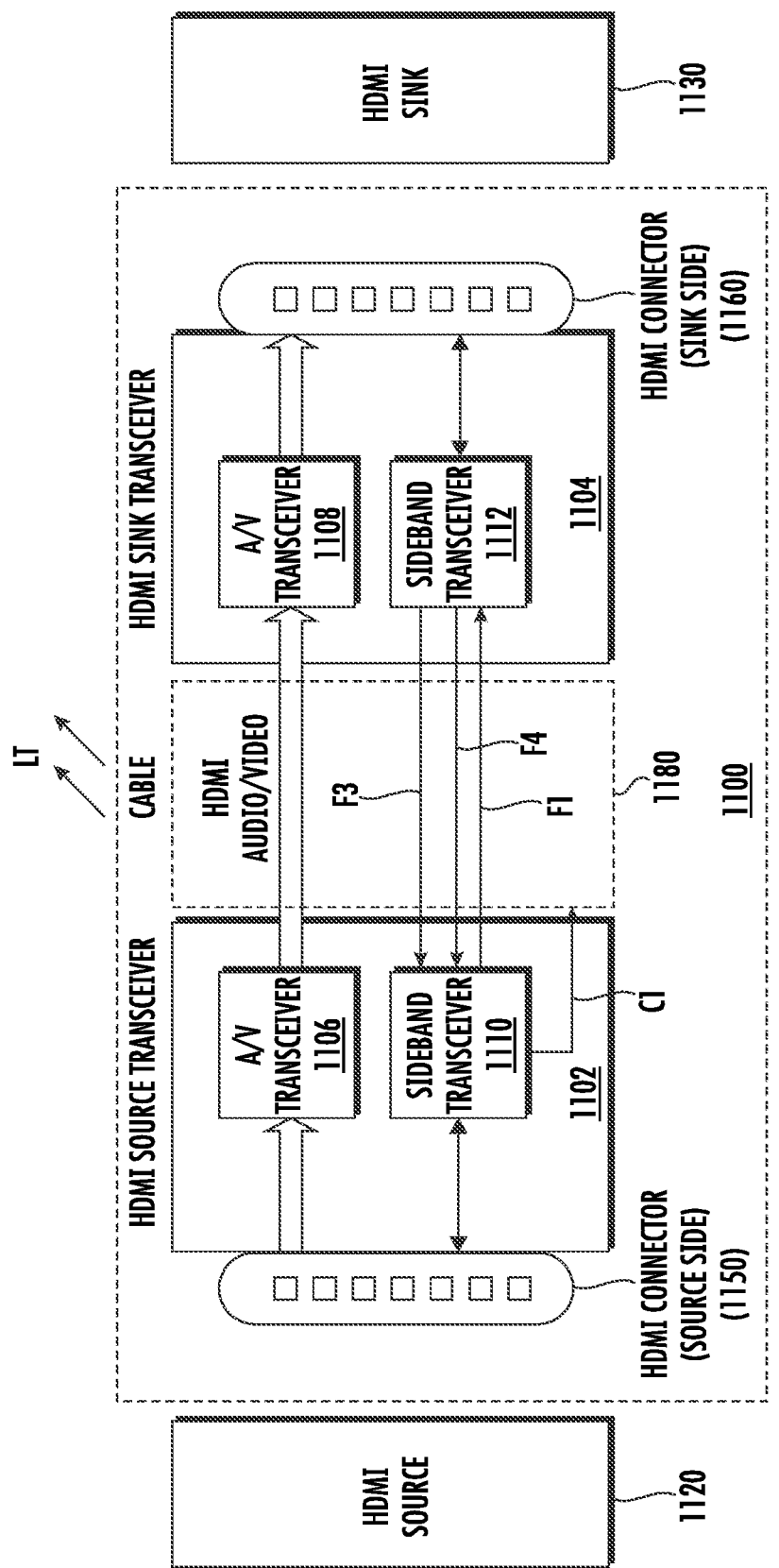

Referring now to FIG. 19, an optical communication interface 1100 according to example aspects of the present disclosure is depicted. The optical communication interface 1100 can be, for example, a HDMI communication interface which uses optical communication.

As shown, the optical communication interface 1100 can include transceivers 1102 and 1104 positioned at opposite ends of cable 1180. HDMI Connector 1150 can be configured to connect the HDMI source transceiver 1102 to HDMI source 1120. Similarly, HDMI Connector 1160 can be configured to connect the HDMI sink transceiver 1104 to HDMI sink 1130.

HDMI source transceiver 1102 can include audio/visual (A/V) transceiver 1106 and sideband transceiver 1110. Similarly, HDMI sink transceiver 1112 can include A/V transceiver 1108 and sideband transceiver 1112. The transceivers 1102 and 1104 can communicate via fibers in the cable 1180. For example, optical signals can be communicated through Fibers F1-F4 and A/V signals can be communicated through A/V Fibers. The A/V fibers can be optical A/V fibers which can communicate signals between A/V transceiver 1106 and A/V transceiver 1108. The optical signals communicated from sideband transceiver 1110 to sideband transceiver 1112 via fibers F1-F4 can be optical sideband signals.

In some implementations, Audio Return Channel (ARC) or Enhanced Audio Return Channel (eARC) signals can be transmitted by fiber F3. In some implementations, data information can be transmitted by the fibers F1 and F4. In some implementations, sideband transceiver 1110 can include a transmitter 1021, a receiver 1022, and a light-control circuit 1023, as depicted in FIGS. 13 and 16. Similar to the light-control circuits 1023 depicted in FIGS. 13 and 16, the light-control circuit 1023 can generate a light-control signal C1 to control the light LT of the cable 1180 according to a data information processed by the transmitter 1021. For example, the data information can be a data transmitting rate (e.g., a rate of the data transmitted from the transmitter 11021 over fibers F1, F3, F4, etc.), a clock rate (e.g., a frequency of a clock cycle), an image resolution (e.g. a number of pixels of a communicated image), a power consumption (e.g., a power consumption of a sink device, a source device, etc.), a temperature (e.g., an operating temperature), a vibration level (e.g., from a vibration sensor as describe herein), and/or a content of the transmitting data (e.g., a type of data transmitted).

In some implementations, the light-control circuit 1023 can be configured to control the lighting modes of the light-emitting element 1190, such as the lighting color, frequency, brightness, type of light, a number of lights, and/or other attributes of the light LT as described herein. For example, the light LT emitted by the light-emitting element 1190 can be controlled by the light-control circuit 1023 according to the data information of one or more signals communicated over the fibers (e.g., F1-F4).

The light-control circuit 1023 can be implemented by any suitable means, such as an application specific integrated circuit (ASIC), digital signal processing (DSP) processor, general-purpose processor, processor core, microprocessor, controller, microcontroller, and can be one processor or a plurality of processors that are operatively connected. In some implementations, the light-control circuit 1023 can include one or more non-transitory computer-readable storage media, such as RAM, ROM, EEPROM, EPROM, one or more memory devices, flash memory devices, etc., and combinations thereof.

In this way, the light LT emitted by the light-emitting element 1190 can be controlled to provide visual information to a user. For example, the light LT emitted by the light-emitting element 1190 can be controlled by the light-control circuit 1023 to provide a visual indication of one or more attributes of the data information being communicated over the cable 1180. This can allow for a user to readily ascertain an operating status of the source device, sink device, and/or the optical communication interface 1100.

Figure 20:
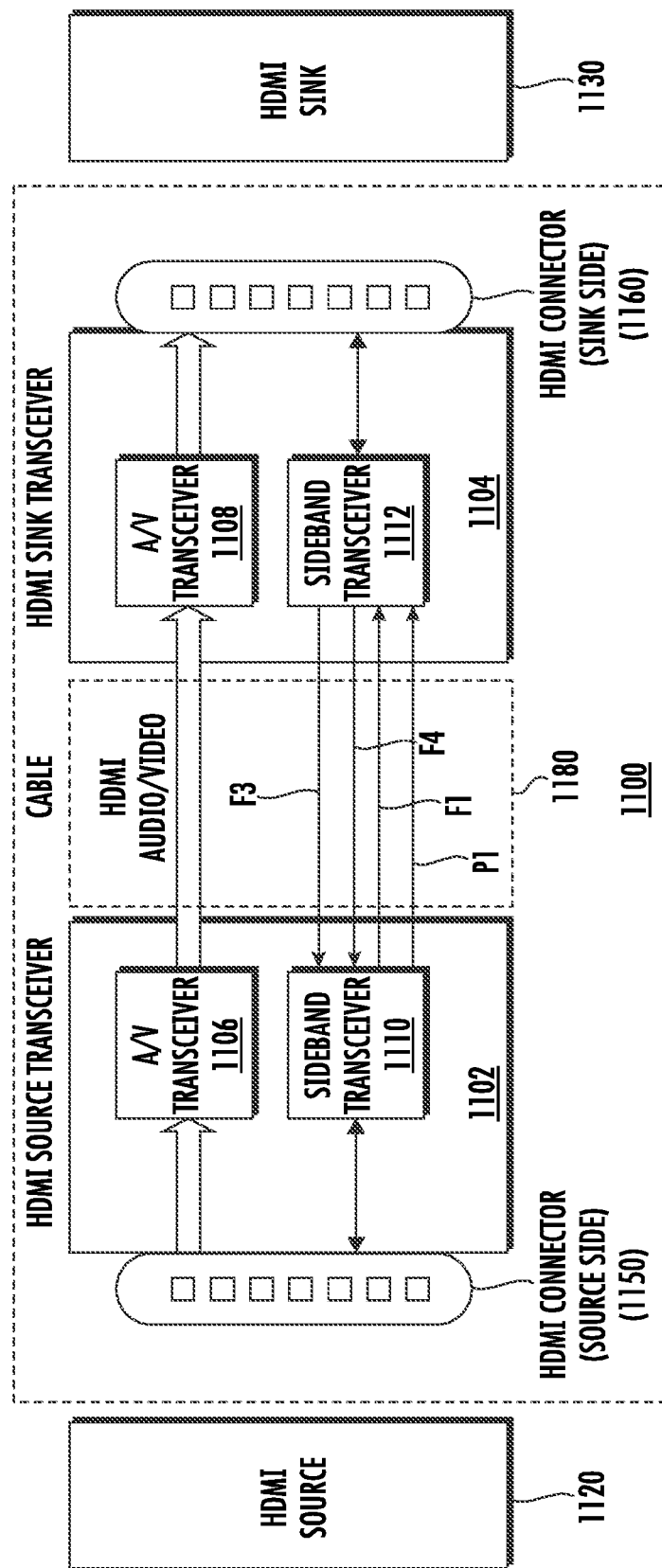

Referring now to FIG. 20, an optical communication interface 1100 according to example aspects of the present disclosure is depicted. The optical communication interface 1100 can be, for example, a HDMI communication interface which uses optical communication.

As shown, the optical communication interface 1100 can include transceivers 1102 and 1104 positioned at opposite ends of cable 1180. HDMI Connector 1150 can be configured to connect the HDMI source transceiver 1102 to HDMI source 1120. Similarly, HDMI Connector 1160 can be configured to connect the HDMI sink transceiver 1104 to HDMI sink 1130.

HDMI source transceiver 1102 can include audio/visual (A/V) transceiver 1106 and sideband transceiver 1110. Similarly, HDMI sink transceiver 1112 can include A/V transceiver 1108 and sideband transceiver 1112. The transceivers 1102 and 1104 can communicate via fibers in the cable 1180. For example, optical signals can be communicated through Fibers F1-F4 and A/V signals can be communicated through A/V Fibers. The A/V fibers can be optical A/V fibers which can communicate signals between A/V transceiver 1106 and A/V transceiver 1108. The optical signals communicated from sideband transceiver 1110 to sideband transceiver 1112 via fibers F1-F4 can be optical sideband signals.

As shown, the sideband transceiver 1110 can further be configured to provide power over fiber P1 to the sideband transceiver 1112. For example, fiber P1 can be an optical fiber, and optical signals transmitted by the transmitter 1021 through the fiber P1 can be converted to an electrical signal which can be used to power the receiver 1042. In some implementations, sideband transceiver 1110 can include a transmitter 1021 and a receiver 1022 and sideband transceiver 1112 can include a transmitter 1041 and a receiver 1042, as depicted in FIGS. 15-17. Similarly, in some implementations, the sideband transceiver 1110 can further be configured to provide power to A/V transceiver 1108. For example, sideband transceiver 1110 can convert an electrical power signal into an optical signal, transmit the optical signal to sideband transceiver 1112 over fiber P1, and sideband transceiver 1112 can convert the optical signal to an electric power signal. Further, sideband transceiver 1112 can be configured to provide the electrical power signal to A/V transceiver 1108. An advantage provided by such a configuration is the ability to eliminate the need for an additional power pin connected to a power source through a sink device (e.g., a TV or monitor).

Further, in some implementations, the optical signal transmitted on the fiber P1 can be a high power signal. The power of the optical signal transmitted on the fiber P1 can be higher than the power of the optical signals transmitted on the fibers F1-F4. In some implementations, when the power level is less than a threshold (e.g., 5% of total power) or a condition indicates that one or more of fibers F1-F4 or cable 1180 may be damaged, the optical signal transmitted on fiber P1 can be stopped. This can improve the safety of the optical communication interface 1100.

Figure 21:
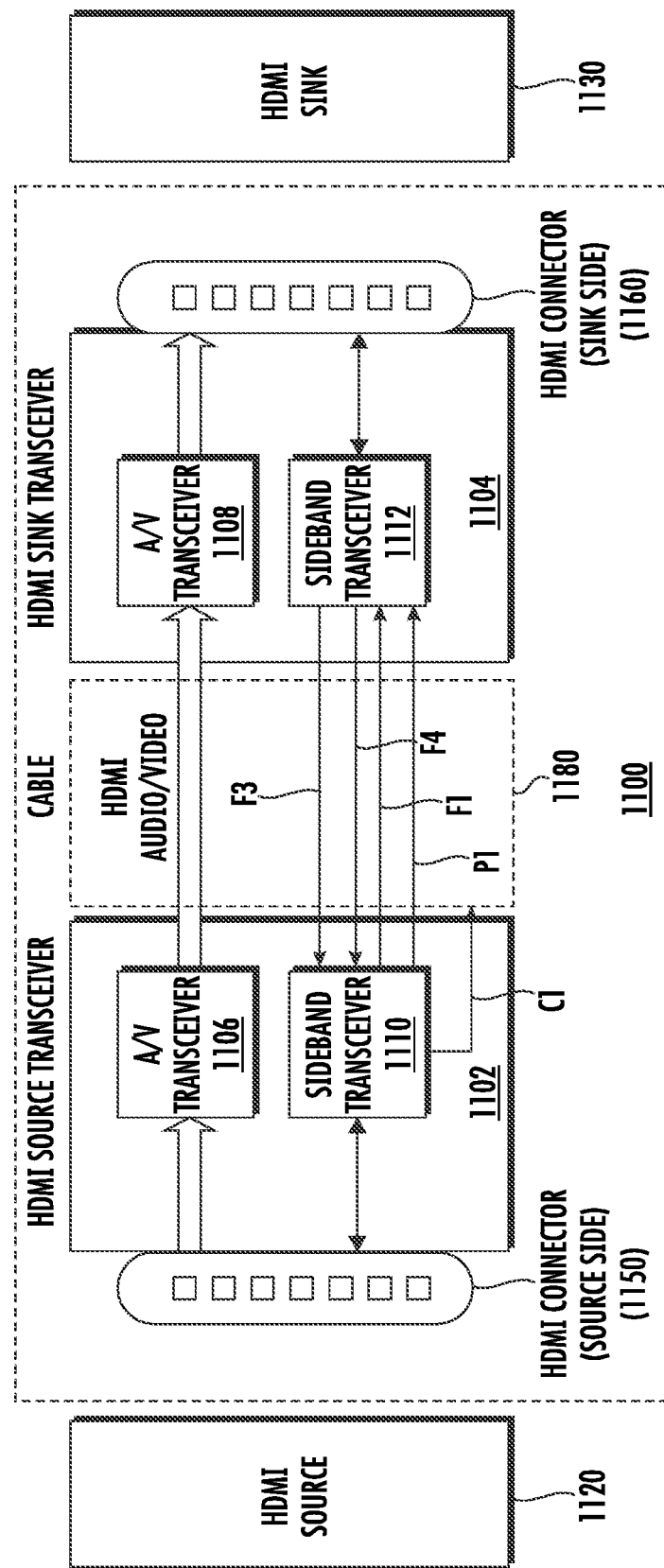

Referring now to FIG. 21, an optical communication interface 1100 according to example aspects of the present disclosure is depicted. The optical communication interface 1100 can be, for example, a HDMI communication interface which uses optical communication.

As shown, HDMI source transceiver 1102 can include audio/visual (A/V) transceiver 1106 and sideband transceiver 1110. Similarly, HDMI sink transceiver 1112 can include A/V transceiver 1108 and sideband transceiver 1112. The transceivers 1102 and 1104 can communicate via fibers in the cable 1180. For example, optical signals can be communicated through Fibers F1-F4 and A/V signals can be communicated through A/V Fibers. The A/V fibers can be optical A/V fibers which can communicate signals between A/V transceiver 1106 and A/V transceiver 1108. The optical signals communicated from sideband transceiver 1110 to sideband transceiver 1112 via fibers F1-F4 can be optical sideband signals.

Similar to FIG. 19, sideband transceiver 1110 can include a transmitter 1021, a receiver 1022, and a light-control circuit 1023. Similar to the light-control circuits 1023 described herein with respect to other Figs., the light-control circuit 1023 can generate a light-control signal C1 to control the light LT of the cable 1180 according to a data information processed by the transmitter 1021. For example, the data information (e.g., one or more characteristics) can be a data transmitting rate (e.g., a rate of the data transmitted from the transmitter 1021 over fibers F1, F3, F4, etc.), a clock rate (e.g., a frequency of a clock cycle), an image resolution (e.g. a number of pixels of a communicated image), a power consumption (e.g., a power consumption of a sink device, a source device, etc.), a temperature (e.g., an operating temperature), a vibration level (e.g., from a vibration sensor as describe herein), and/or a content of the transmitting data (e.g., a type of data transmitted).

Further, similar to FIG. 20, the sideband transceiver 1110 can further be configured to provide power over fiber P1 to the sideband transceiver 1112. In some implementations, the power provided to the sideband transceiver 1112 can be used to power the A/V transceiver 108 and/or the sideband transceiver 1112.

Figure 22:
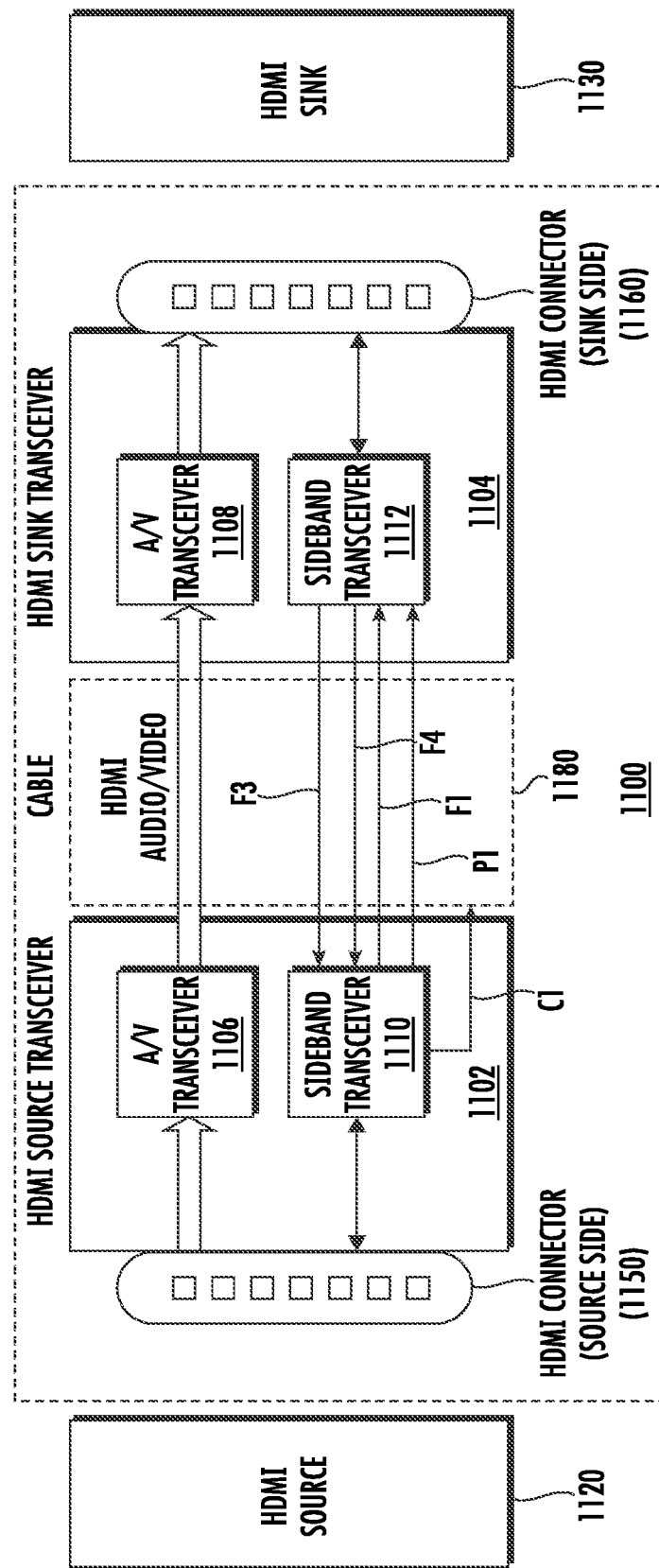

Referring now to FIG. 22, an optical communication interface 1100 according to example aspects of the present disclosure is depicted. The optical communication interface 1100 can be, for example, a HDMI communication interface which uses optical communication.

As shown, HDMI source transceiver 1102 can include audio/visual (A/V) transceiver 1106 and sideband transceiver 1110. Similarly, HDMI sink transceiver 1112 can include A/V transceiver 1108 and sideband transceiver 1112. The transceivers 1102 and 1104 can communicate via fibers in the cable 1180. For example, optical signals can be communicated through Fibers F1-F4 and A/V signals can be communicated through A/V Fibers. The A/V fibers can be optical A/V fibers which can communicate signals between A/V transceiver 1106 and A/V transceiver 1108. The optical signals communicated from sideband transceiver 1110 to sideband transceiver 1112 via fibers F1-F4 can be optical sideband signals.

Similar to FIG. 21, sideband transceiver 1110 can include a transmitter 1021, a receiver 1022, and a light-control circuit 1023. Similar to the light-control circuits 1023 described herein, the light-control circuit 1023 can generate a light-control signal C1 to control the light LT of the cable 1180 according to a data information processed by the transmitter 1021. For example, the data information can be a data transmitting rate (e.g., a rate of the data transmitted from the transmitter 1021 over fibers F1, F3, F4, etc.), a clock rate (e.g., a frequency of a clock cycle), an image resolution (e.g. a number of pixels of a communicated image), a power consumption (e.g., a power consumption of a sink device, a source device, etc.), a temperature (e.g., an operating temperature), a vibration level (e.g., from a vibration sensor as describe herein), and/or a content of the transmitting data (e.g., a type of data transmitted). Additionally, the sideband transceiver 1110 can further be configured to provide power over fiber P1 to the sideband transceiver 1112. In some implementations, the power provided to the sideband transceiver 1112 can be used to power the A/V transceiver 1108 and/or the sideband transceiver 1112.

Moreover, similar to the optical communication interface 1100 depicted in FIG. 18, a vibration sensor 1024 can be included in or otherwise a part of a transceiver 1102 (e.g., as a part of sideband transceiver 1110). In some implementations, the vibration sensor 1024 can be a G-sensor or a GYRO-sensor. In some implementations, the vibration sensor 1024 can be configured to use Micro-Electro-Mechanical-Systems (MEMS) technology and packaging. In so some implementations, the vibration sensor 1024 can be configured to transmit a data information about a vibration level to the light-control circuit 1023. For example, the vibration level can correspond to a vibration detected by the vibration sensor 1024 and/or a vibration associated with a connected device (e.g., a source device connected to connector 1150). The light-control circuit 1023 can be configured to control a light LT according to the data information (e.g., the vibration level). As examples, the light LT emitted by the light-emitting element 1190 can pulse at a vibration frequency or have a brightness associated with a vibration level (e.g., various vibration level thresholds can correspond to brightness levels).

In some implementations, the vibration sensor 1024 can be positioned or otherwise included in a transceiver 1104. For example, the transceiver 1104 can include a vibration sensor 1024 and a light-control circuit 1043 as depicted in FIGS. 14 and 17. Further, the vibration level can correspond to a vibration detected by the vibration sensor 1024 and/or a vibration associated with a connected device (e.g., a sink device connected to connector 1160).

This application optical communication interfaces to enable feature light and power over fiber technologies. While the disclosure has been described by way of example and in terms of a preferred embodiment, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optical communication interface system, comprising:
    a first coupling module comprising:
        a first device connector for coupling to a first electronic device, the first coupling module configured to:
        receive a power-on signal from the first electronic device;
        in response to receiving the power-on signal, generate a first optical signal representing the power-on signal; and
        transmit the first optical signal to a second coupling module;
    the second coupling module comprising:
        a second device connector for coupling to a second electronic device, the second coupling module configured to:
        receive the first optical signal;
        in response to receiving the first optical signal, generate a second optical signal; and
        transmit the second optical signal to the first coupling module; and
    a cable coupled between the first coupling module and the second coupling module, the cable comprising a first plurality of data-channel fibers for data transmission between the first coupling module and the second coupling module,
    wherein the first coupling module is further configured to transmit first data associated with the first electronic device to the second coupling module,
    wherein the second coupling module is further configured to transmit second data associated with the second electronic device to the first coupling module, and
    wherein the first coupling module is further configured to transmit third data over the first plurality of data-channel fibers to the second coupling module in response to receiving the second optical signal from the second coupling module.

2. The optical communication interface system of claim 1, wherein the second optical signal represents a hot-plug-detect (HPD) signal.

3. The optical communication interface system of claim 1, wherein the cable further comprises a first sideband fiber and a second sideband fiber, wherein the first coupling module is configured to transmit the first data associated with the first electronic device to the second coupling module via the first sideband fiber, and wherein the second coupling module is configured to transmit the second data associated with the second electronic device to the first coupling module via the second sideband fiber.

4. The optical communication interface system of claim 3, wherein the first coupling module is further configured to transmit sideband data including one or more of power information, ARC/eARC (audio return channel), SCL (clock in display data channel), SDA (data in display data channel), CEC (consumer electronics control), or HPD (hot-plug detect) via the first sideband fiber.

5. The optical communication interface system of claim 1, wherein the second coupling module is further configured to transmit fourth data over the first plurality of data-channel fibers to the first coupling module.

6. The optical communication interface system of claim 1, wherein the cable further comprises a second plurality of data-channel fibers, and wherein the second coupling module is further configured to transmit fourth data over the second plurality of data-channel fibers to the first coupling module.

7. The optical communication interface system of claim 1, wherein the first device connector is a High-Definition Multimedia Interface connector, and wherein the second device connector is a High-Definition Multimedia Interface connector.

8. The optical communication interface system of claim 1, wherein the second coupling module is configured to generate an electronic signal for the second electronic device in response to receiving the first optical signal.

9. The optical communication interface system of claim 8, further comprising a third device connector, wherein the first coupling module is configured to generate the electronic signal using a voltage supply from the third device connector.

10. The optical communication interface system of claim 9, wherein the third device connector is a Universal Serial Bus connector.

11. The optical communication interface system of claim 10, wherein the third device connector is coupled to the second electronic device.

12. The optical communication interface system of claim 1, wherein the first coupling module further comprises a data transfer circuitry, wherein the first coupling module is configured to initiate an activation of the data transfer circuitry in response to receiving the second optical signal, and wherein the data transfer circuitry is configured to transmit the third data in response to the activation.

13. The optical communication interface system of claim 1, wherein the cable further comprises a first detachable component and a second detachable component, wherein the first detachable component is detachable from the first coupling module, and wherein the second detachable component is detachable from the second coupling module such that the cable is detachable from the first coupling module or the second coupling module without removing the first coupling module from the first electronic device or removing the second coupling module from the second electronic device.

14. The optical communication interface system of claim 1, wherein the cable further comprises one or more electrical wires.

15. The optical communication interface system of claim 1, wherein the cable further comprises one or more light-emitting elements configured to emit a light corresponding to one or more characteristics of the first coupling module or the second coupling module.

16. The optical communication interface system of claim 15, wherein the first coupling module further comprises:
- a light-control circuit for controlling the one or more light-emitting elements; and
- a vibration sensor configured to detect a vibration level of the first coupling module and to communicate the vibration level to the light-control circuit.

17. The optical communication interface system of claim 15, wherein the one or more characteristics comprise one or more of a data transmitting rate, a clock rate, an image resolution, a power level, a temperature, a vibration level, or a content associated with data transmission over the first plurality of data-channel fibers.

18. The optical communication interface system of claim 1, wherein the second data associated with the second electronic device includes Extended Display Identification Data (EDID) indicative of capabilities of the second electronic device.

19. The optical communication interface system of claim 1, wherein the first coupling module is configured to transmit the third data over the first plurality of data-channel fibers to the second coupling module using a Transition-Minimized Differential Signaling (TMDS) protocol.

20. The optical communication interface system of claim 1, wherein the first coupling module further comprises a switch configured to toggle data transmission from the first coupling module to the second coupling module.

* * * * *